(12) United States Patent
Mizutani et al.

(10) Patent No.: US 10,454,364 B2
(45) Date of Patent: Oct. 22, 2019

(54) POWER CONVERTOR

(71) Applicant: Mitsubishi Electric Corporation, Chiyoda-ku (JP)

(72) Inventors: Hiroto Mizutani, Chiyoda-ku (JP); Ryota Kondo, Chiyoda-ku (JP); Takaaki Takahara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/769,376

(22) PCT Filed: Jan. 26, 2017

(86) PCT No.: PCT/JP2017/002759
§ 371 (c)(1),
(2) Date: Apr. 19, 2018

(87) PCT Pub. No.: WO2017/131096
PCT Pub. Date: Aug. 3, 2017

(65) Prior Publication Data
US 2018/0323700 A1    Nov. 8, 2018

(30) Foreign Application Priority Data
Jan. 29, 2017   (JP) .................................. 2016-015524

(51) Int. Cl.
*H02M 3/335*     (2006.01)
*H02M 1/088*     (2006.01)
(Continued)

(52) U.S. Cl.
CPC .......... *H02M 1/4233* (2013.01); *H02M 1/088* (2013.01); *H02M 1/4258* (2013.01);
(Continued)

(58) Field of Classification Search
CPC .. H02M 3/335; H02M 3/33576; H02M 1/088; H02M 1/4233; H02M 7/155;
(Continued)

(56) References Cited

U.S. PATENT DOCUMENTS 5,940,280 A * 8/1999 Murai ..................... H02J 7/022
                                                 363/132
9,007,042 B2 * 4/2015 Okuda .................. H02M 3/158
                                                 323/271
(Continued)

FOREIGN PATENT DOCUMENTS

JP      2012-249375 A    12/2012
WO   WO 2010/137278 A1   12/2010
WO   WO 2015/174123 A1   11/2015

OTHER PUBLICATIONS

International Search Report dated Feb. 28, 2017 in PCT/JP2017/002759, filed on Jan. 26, 2017.
(Continued)

*Primary Examiner* — Yusef A Ahmed
*Assistant Examiner* — Sisay G Tiku
(74) *Attorney, Agent, or Firm* — Oblon, McClelland, Maier & Neustadt, L.L.P.

(57) ABSTRACT

This power conversion device includes: a rectification circuit; an inverter circuit having a full-bridge configuration, and having a DC capacitor, and first and second legs each of which has two switching elements connected in series to each other; a transformer; and a control circuit for controlling operation of the inverter circuit, wherein the control circuit controls an ON period for the first leg, thereby controlling increase/decrease in current flowing through a first rectification circuit from an AC input, and controls an ON period for the second leg and a phase shift amount between the ON period for the first leg and the ON period for the second leg, thereby controlling voltage of the DC
(Continued)

capacitor to be constant. Thus, it becomes possible to achieve high-power-factor control and output power control at the same time by a single stage of full-bridge inverter circuit.

14 Claims, 16 Drawing Sheets

(51) Int. Cl.
*H02M 1/42* (2007.01)
*H02M 7/155* (2006.01)
*H02M 7/757* (2006.01)
*H02M 3/337* (2006.01)
*H02M 7/06* (2006.01)
*H02M 7/5387* (2007.01)
*H02M 1/00* (2006.01)

(52) U.S. Cl.
CPC ..... *H02M 3/3376* (2013.01); *H02M 3/33553* (2013.01); *H02M 3/33576* (2013.01); *H02M 7/06* (2013.01); *H02M 7/53871* (2013.01); *H02M 2001/0009* (2013.01)

(58) Field of Classification Search
CPC ........ H02M 7/757; H02M 7/797; H02M 7/68; H02M 7/72; H02M 7/81
See application file for complete search history.

(56) References Cited

U.S. PATENT DOCUMENTS

| | | | | |
|---|---|---|---|---|
| 9,065,341 B2* | 6/2015 | Murakami | ........ | H02M 3/33507 |
| 9,809,121 B2* | 11/2017 | King | ..................... | H02J 7/0045 |
| 10,008,945 B2* | 6/2018 | Satoh | ....................... | H02M 1/08 |
| 10,044,278 B2* | 8/2018 | Kondo | ................ | H02M 1/4225 |
| 2008/0247194 A1* | 10/2008 | Ying | ................... | H02M 3/3376 363/17 |
| 2011/0188275 A1* | 8/2011 | Mino | ...................... | H02M 1/36 363/49 |
| 2011/0215651 A1* | 9/2011 | Yamada | .................. | H02M 1/12 307/75 |
| 2011/0273909 A1* | 11/2011 | Christopher | ........ | H02M 3/3376 363/17 |
| 2012/0120687 A1 | 5/2012 | Ohsaki et al. | | |
| 2012/0300502 A1* | 11/2012 | Shimada | ............. | H02M 1/4258 363/17 |
| 2012/0307529 A1* | 12/2012 | Chiba | ..................... | H02M 1/08 363/17 |
| 2013/0002215 A1* | 1/2013 | Ikeda | .................... | H02M 3/158 323/271 |
| 2013/0301323 A1* | 11/2013 | Iyasu | .................... | H02M 7/797 363/123 |
| 2015/0043253 A1* | 2/2015 | Awane | ................ | H02M 1/4258 363/37 |
| 2015/0280591 A1* | 10/2015 | Handa | ................. | H02M 1/4225 363/21.04 |
| 2015/0280593 A1* | 10/2015 | Ando | ..................... | H02M 1/42 363/17 |
| 2016/0197562 A1* | 7/2016 | Kondo | ................ | H02M 7/2176 363/126 |
| 2016/0280080 A1* | 9/2016 | Takei | .................. | B60L 11/1811 |
| 2017/0179836 A1 | 6/2017 | Kondo et al. | | |
| 2017/0237354 A1* | 8/2017 | Takahara | ................ | H02M 3/28 363/17 |
| 2017/0244317 A1* | 8/2017 | Kondo | ................... | H02M 3/155 |

OTHER PUBLICATIONS

Extended European Search Report dated Dec. 12, 2018 in corresponding European Patent Application No. 17744326.4, 6 pages.

* cited by examiner

FIG. 2
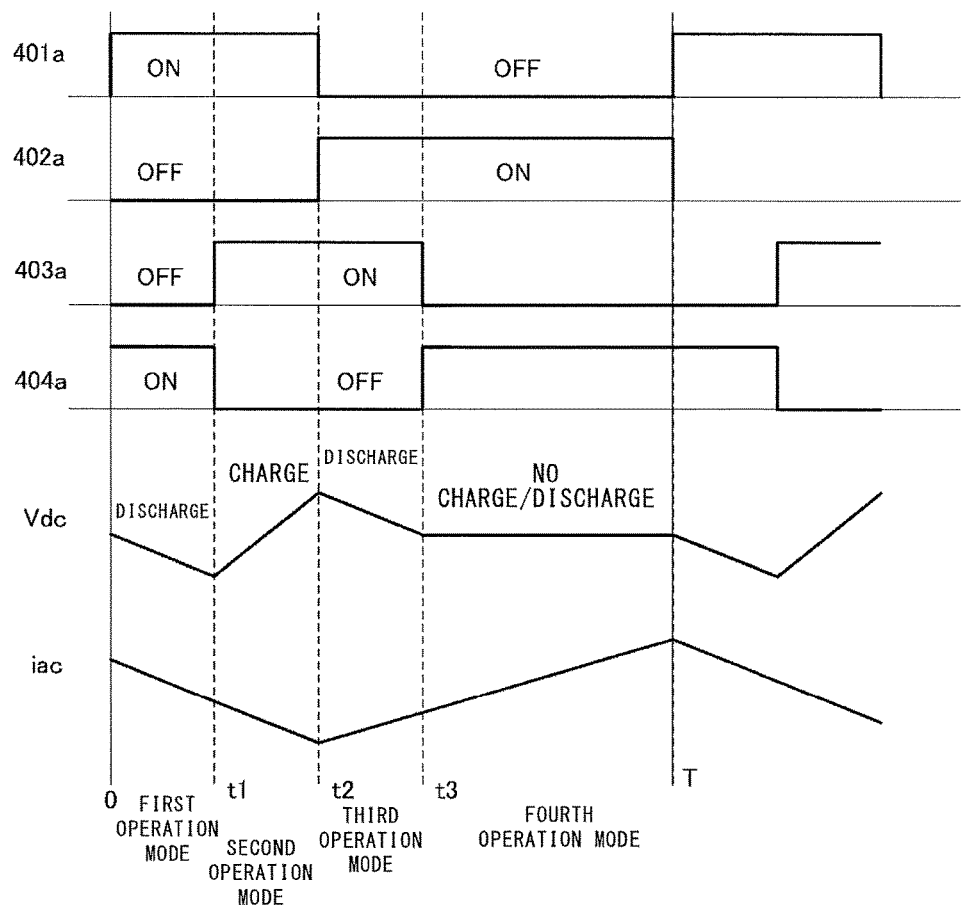
FIG. 3 FIRST OPERATION MODE
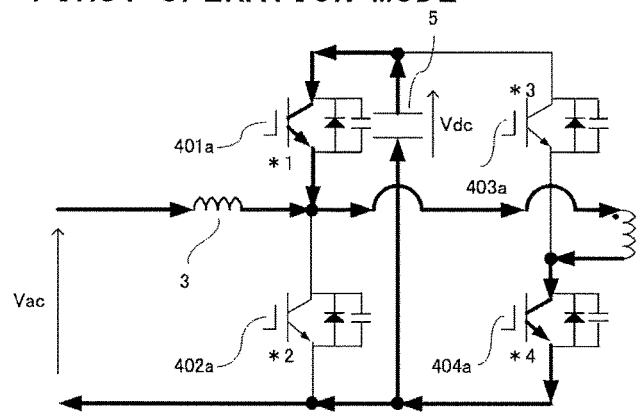

FIG. 4   SECOND OPERATION MODE
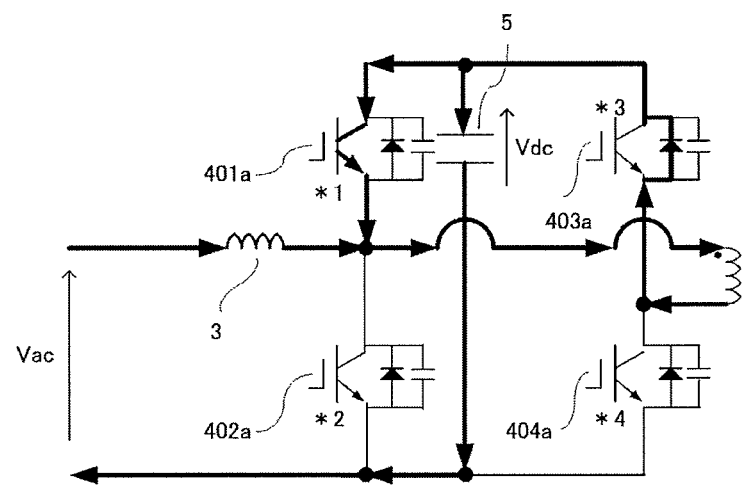
FIG. 5   THIRD OPERATION MODE
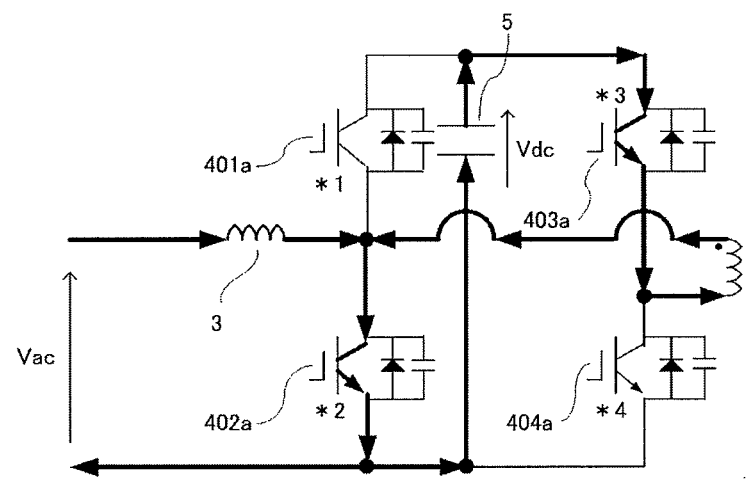

FOURTH OPERATION MODE

POWER CONVERTOR

TECHNICAL FIELD

The present invention relates to a power conversion device that converts the power of input from an AC power supply to obtain desired DC power.

BACKGROUND ART

Power conversion devices that convert AC power supplied from an AC power supply to DC power and supply the DC power to a DC load are increasingly required to have high efficiency, while power conversion devices for achieving high efficiency are proposed (see, for example, Patent Document 1). A power conversion device disclosed in Patent Document 1 is composed of: a rectification circuit connected to an AC power supply; a smoothing capacitor connected to the rectification circuit; a first switching circuit connected to the rectification circuit via the smoothing capacitor; a transformer provided with a resonance capacitor and a resonance inductor; and a second switching circuit provided on a DC load side with respect to the transformer. In the power conversion device, switching operation of the second switching circuit is controlled, whereby switching loss is reduced and high efficiency is achieved.

CITATION LIST

Patent Document

Patent Document 1: Japanese Laid-Open Patent Publication No. 2012-249375

SUMMARY OF THE INVENTION

Problems to be Solved by the Invention

In the conventional power conversion device described above, since a current smoothing reactor is not provided at a DC output portion, it is difficult to perform high-power-factor control of AC current and adjustment of DC power outputted to the DC load at the same time. Therefore, ripple components of unspecified frequencies are inputted to the DC load, and in the case of using a battery as the DC load, ripple components of unspecified frequencies are mixed into battery current, whereby the battery might be deteriorated, leading to reduction in the life thereof.

The present invention has been made to solve the above problem, and an object of the present invention is to obtain a power converter capable of performing high-power-factor control of AC current and control of output power to the DC load.

Solution to the Problems

A power conversion device according to the present invention includes: a first rectification circuit which rectifies AC power inputted from an AC power supply; an inverter circuit having a first leg, a second leg, and a DC capacitor connected in parallel to each other, the first leg having a first switching element and a second switching element connected in series to each other, a positive-side DC terminal of the first rectification circuit being connected to a first AC end which is a connection point between the first switching element and the second switching element, the second leg having a third switching element and a fourth switching element to which diodes are respectively connected in antiparallel, the third switching element and the fourth switching element being connected in series to each other, the inverter circuit having a negative-side DC bus connected to a negative-side DC terminal of the first rectification circuit; a transformer having a primary winding and a secondary winding, one end of the primary winding being connected to the first AC end of the inverter circuit, and another end of the primary winding being connected to a second AC end which is a connection point between the third switching element and the fourth switching element; a second rectification circuit having one end connected to the secondary winding of the transformer and another end connected to a DC load via a smoothing capacitor, the second rectification circuit rectifying AC power inputted from the transformer, and outputting the resultant power to the DC load; and a control circuit which controls operation of the inverter circuit, wherein the control circuit controls an ON period for the first leg, thereby controlling current outputted from the first rectification circuit, and the control circuit controls an ON period for the second leg and a phase shift amount between the ON period for the first leg and the ON period for the second leg, thereby controlling voltage of the DC capacitor to be constant.

Effect of the Invention

The power conversion device according to the present invention makes it possible to achieve high-power-factor control and output power control at the same time by a single stage of full-bridge inverter circuit. Thus, in the case where a battery is connected as a DC load and a charging operation is performed, it becomes possible to supply charge power while reducing ripple components of unspecified frequencies which are mixed in battery current, whereby battery life deterioration can be prevented.

BRIEF DESCRIPTION OF THE DRAWINGS

FIG. 2 is a diagram illustrating operations of switching elements in the power conversion device shown in embodiment 1 of the present invention.

FIG. 3 is a diagram showing a current route in the power conversion device shown in embodiment 1 of the present invention.

FIG. 4 is a diagram showing a current route in the power conversion device shown in embodiment 1 of the present invention.

FIG. 5 is a diagram showing a current route in the power conversion device shown in embodiment 1 of the present invention.

DESCRIPTION OF EMBODIMENTS

Embodiment 1

Figure 1:
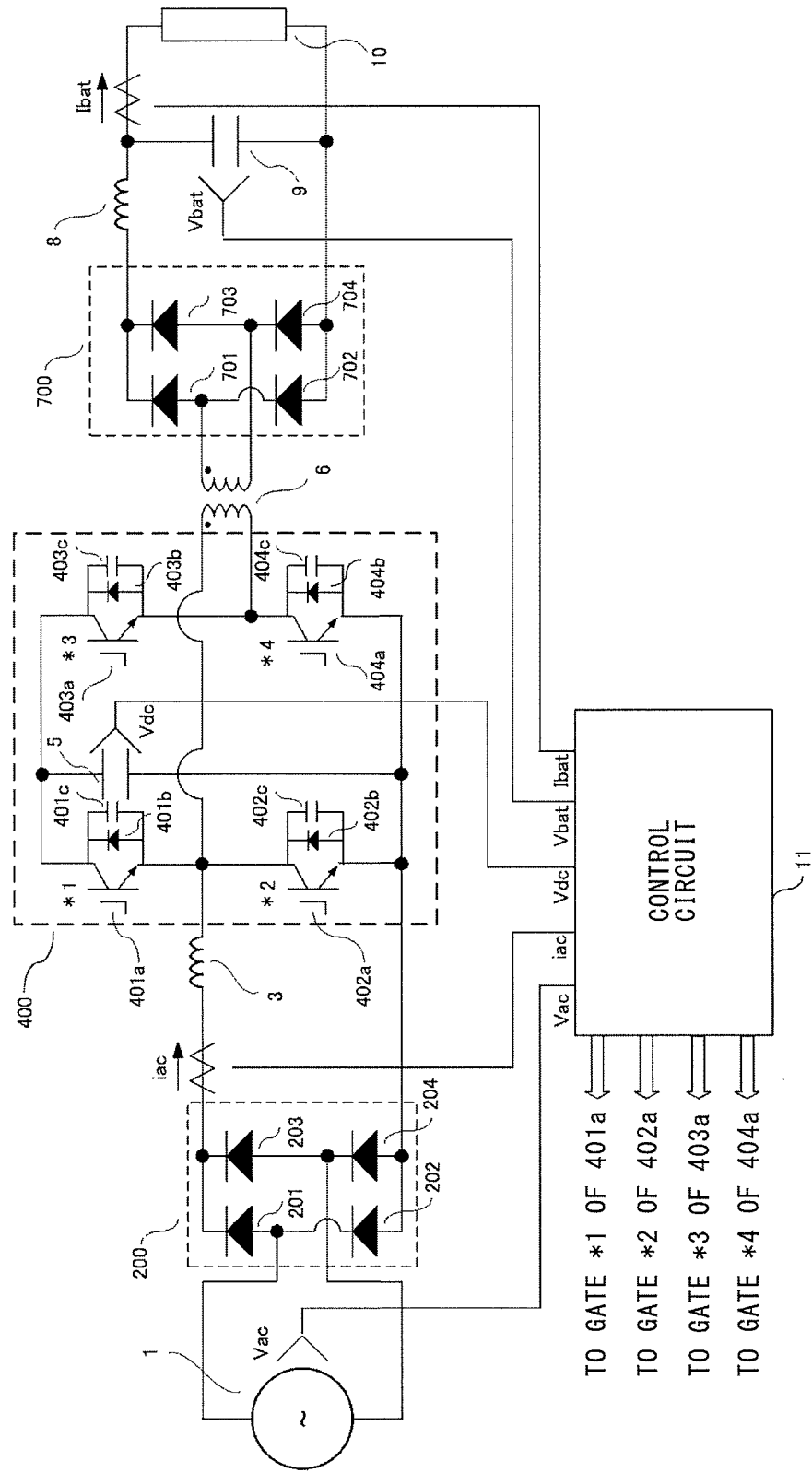
FIG. 1 is a configuration diagram of a power conversion device shown in embodiment 1 of the present invention.

The configuration of a power conversion device according to embodiment 1 of the present invention will be described with reference to the drawings. FIG. 1 is a configuration diagram of the power conversion device according to embodiment 1 of the present invention. The power conversion device shown in FIG. 1 is connected to an AC power supply 1 and a DC load 10, and converts AC power inputted from the AC power supply 1, to DC power, and outputs the DC power to the DC load 10.

The power conversion device is composed of a main circuit for converting AC power inputted from the AC power supply 1 to DC power, and a control circuit for controlling the main circuit. The main circuit includes a transformer 6 having at least two windings. In the following description, of the main circuit, a side connected to the AC power supply 1 with respect to the transformer is assumed as a primary side, and a side connected to the DC load 10 is assumed as a secondary side. On the primary side of the main circuit, provided are: a rectification circuit (first rectification circuit) 200 for rectifying AC power; a reactor 3 operating as a current limiting circuit; and an inverter circuit 400 which converts DC power rectified by the rectification circuit 200 to AC power having desired voltage, and outputs the AC power to the transformer 6. On the secondary side of the main circuit, provided are: a rectification circuit (second rectification circuit) 700 for rectifying AC power outputted from the transformer 6 into DC power; and a smoothing reactor 8 and a smoothing capacitor 9 for smoothing DC power outputted from the rectification circuit 700.

The rectification circuit 200 as the first rectification circuit is connected to the AC power supply 1, and rectifies input from the AC power supply 1 so as to be converted to DC power. The rectification circuit 200 is a full-bridge circuit composed of four diode elements 201 to 204. A DC terminal of the rectification circuit 200 is connected to the inverter circuit 400 via the reactor 3. Here, of the two DC terminals of the rectification circuit 200, the positive-side terminal is referred to as a positive-side DC terminal, and the negative-side terminal is referred to as a negative-side DC terminal. It is noted that the rectification circuit 200 is not limited to the above configuration but may be any circuit that rectifies AC power into DC power. For example, some or all of the diode elements in the rectification circuit 200 may be replaced with active elements such as switching elements.

The reactor 3 is a current limiting reactor having an end connected to the positive-side DC terminal of the rectification circuit 200, and another end connected to the inverter circuit 400. The connection point between the reactor 3 and the inverter circuit 400 is connected to the primary-side terminal of the transformer 6. It is noted that the reactor 3 may be connected to the negative-side DC terminal of the rectification circuit 200, or reactors 3 may be distributed and connected to the two DC terminals of the rectification circuit 200.

The inverter circuit 400 is a full-bridge inverter circuit having four semiconductor switching elements 401a to 404a, and each semiconductor switching element performs switching operation on the basis of a gate signal from the control circuit 11. For the semiconductor switching elements 401a to 404a, diodes 401b to 404b are respectively connected in antiparallel thereto, and capacitors 401c to 404c are connected in parallel thereto. For the semiconductor switching elements 401a to 404a, semiconductor elements such as MOSFETs may be used.

The semiconductor switching element 401a (first switching element) and the semiconductor switching element 402a (second switching element) are connected in series, and the semiconductor switching element 403a (third switching element) and the semiconductor switching element 404a (fourth switching element) are connected in series. Here, the semiconductor switching element 401a and the semiconductor switching element 402a connected in series are referred to as a first leg, and the semiconductor switching element 403a and the semiconductor switching element 404a connected in series are referred to as a second leg. The semiconductor switching element 401a is diagonal to the semiconductor switching element 404a, and the semiconductor switching element 402a is diagonal to the semiconductor switching element 403a.

The connection point (first AC end) between the semiconductor switching element 401a and the semiconductor switching element 402a is connected to the positive-side DC terminal of the rectification circuit 200 via the reactor 3, and is also connected to the primary-side terminal of the transformer 6. The inverter circuit 400 includes a DC capacitor 5, and the DC capacitor 5, the first leg, and the second leg are connected in parallel between DC buses (P and N buses). The negative-side bus of the inverter circuit 400 is connected to the negative-side DC terminal of the rectification circuit 200.

The transformer 6 is an isolation transformer composed of two windings (primary winding and secondary winding). One end of the primary winding is connected to the first AC end of the inverter circuit 400, and the other end is connected to a second AC end which is the connection point between the semiconductor switching element 403a and the semiconductor switching element 404a. Here, a leakage inductance of the transformer 6 is used as a resonance element. However, an external reactor may be used therefor.

The rectification circuit 700 as the second rectification circuit is a full-bridge circuit composed of four diode elements, as in the rectification circuit 200. The AC terminal of the rectification circuit 700 is connected to the secondary-side output terminal of the transformer 6, and rectifies AC power outputted from the transformer 6 and outputs the resultant power from the DC terminal of the rectification circuit 700. It is noted that the rectification circuit 700 is a full-bridge diode rectification type, but may be any circuit that rectifies AC power outputted from the transformer 6. For example, some or all of the diode elements in the rectification circuit 700 may be replaced with active elements such as semiconductor switching elements.

The positive-side DC terminal of the rectification circuit 700 is connected to the smoothing reactor 8, and the smoothing capacitor 9 is connected between the subsequent stage of the smoothing reactor 8 and the negative-side DC terminal of the rectification circuit 700. The DC load 10 is connected to the smoothing capacitor 9, and DC power outputted from the rectification circuit 700 is supplied to the DC load.

The DC load 10 is, for example, a storage battery (battery). Other than this, the DC load 10 may be a DC load needed to be isolated from the AC input, and for example, may be an electric double-layer capacitor.

The power conversion device shown in FIG. 1 is provided with a current detector for detecting current ($i_{ac}$) outputted from the rectification circuit 200 and flowing through the reactor 3, a voltage detector (first voltage detector) for detecting DC voltage ($V_{dc}$) of the DC capacitor 5, and a voltage detector (second voltage detector) for detecting voltage ($V_{bat}$) of the smoothing capacitor 9. In addition, a voltage detector for detecting power supply voltage ($V_{ac}$) of the AC power supply 1, and a current detector for detecting current ($i_{bat}$) inputted to the DC load 10, are provided. Information about these voltage values and current values is inputted to the control circuit 11.

Next, operation of the power conversion device shown in embodiment 1 of the present invention, i.e., operation of converting AC power inputted from the AC power supply 1 to DC power and outputting the DC power to the DC load 10, will be described with reference to the drawings. FIG. 2 shows gate waveforms illustrating operations of the semiconductor switching elements 401a to 404a, current flowing through the reactor 3, and the charge/discharge condition of the DC capacitor 5. FIG. 3 to FIG. 6 show current routes in the power conversion device, in four operation modes defined in FIG. 2.

Here, T is the drive cycle of the semiconductor switching elements 401a, 402a, 403a, 404a, and t2 is a switching time of the semiconductor switching elements 401a and 402a with which current control is performed. In addition, t1 is an OFF timing of the semiconductor switching element 404a, and t3 is an OFF timing of the semiconductor switching element 403a. In this case, operation modes can be classified into operation modes for four periods of 0 to t1 (first operation mode), t1 to t2 (second operation mode), t2 to t3 (third operation mode), and t3 to T (fourth operation mode). The current routes for the respective four operation modes are shown in FIG. 3 to FIG. 6.

Operation of the power conversion device in the first operation mode, i.e., during the period of 0 to t1 shown in FIG. 2 will be described. In the first operation mode, the semiconductor switching elements 401a, 404a are ON and the semiconductor switching elements 402a, 403a are OFF. In the first operation mode, as shown in FIG. 3, current $i_{ac}$ inputted from the AC power supply 1 and rectified by the rectification circuit flows through the reactor 3, the transformer 6, and then semiconductor switching element 404a, to return to the input side. At the same time, current flows from the DC capacitor 5 via the semiconductor switching element 401a to the transformer 6, and then the current returns from the transformer 6 via the semiconductor switching element 404a to the DC capacitor 5. In the first operation mode, the potential at the stage subsequent to the reactor 3 is fixed at $V_{dc}$ by the semiconductor switching element 401a becoming ON. Here, in a state where DC voltage $V_{dc}$ of the DC capacitor 5 is controlled to be higher than peak voltage Vp of voltage $V_{ac}$ of the AC power supply 1, current $i_{ac}$ decreases. The DC capacitor 5 discharges current, and therefore $V_{dc}$ decreases.

Operation of the power conversion device in the second operation mode, i.e., during the period of t1 to t2 shown in FIG. 2 will be described. In the second operation mode, the semiconductor switching elements 401a, 403a are ON and the semiconductor switching elements 402a, 404a are OFF. In the second operation mode, as shown in FIG. 4, current flows through the reactor 3, the transformer 6, the diode element 403b, and then the DC capacitor 5, to return to the input side. Part of the current having flowed through the diode element 403b flows through the semiconductor switching element 401a to circulate to the transformer 6. In the second operation mode, the potential at the stage subsequent to the reactor 3 is fixed at $V_{dc}$ by the semiconductor switching element 401a becoming ON, and in a state where voltage $V_{dc}$ of the DC capacitor 5 is controlled to be higher than peak voltage Vp of voltage $V_{ac}$ of the AC power supply 1, current $i_{ac}$ decreases. The DC capacitor 5 is charged with current, and therefore $V_{dc}$ increases. It is noted that, in the second operation mode, since the potential difference occurring between both ends of the transformer 6 is small, the amount of power outputted to the secondary side is small and therefore is not taken into consideration here.

Operation of the power conversion device in the third operation mode, i.e., during the period of t2 to t3 shown in FIG. 2 will be described. In the third operation mode, the semiconductor switching elements 402a, 403a are ON and the semiconductor switching elements 401*a*, 404*a* are OFF. In the third operation mode, as shown in FIG. 5, current i$_{ac}$ flows back from the reactor 3 via the semiconductor switching element 402*a* to the input side. In addition, current flows from the DC capacitor 5 via the semiconductor switching element 403*a*, the transformer 6, and the semiconductor switching element 402*a* to the DC capacitor 5. In the third operation mode, the potential at the stage subsequent to the reactor 3 is fixed at zero by the semiconductor switching element 402*a* becoming ON, and current i$_{ac}$ increases. The DC capacitor 5 discharges current, and therefore V$_{dc}$ decreases.

Figure 6:
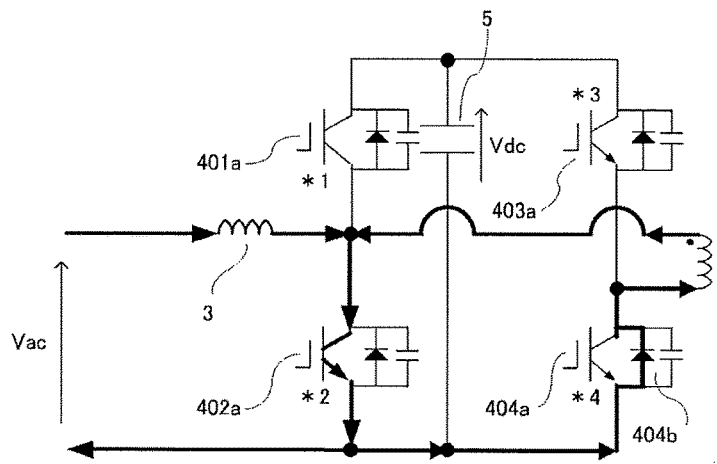
FIG. 6 is a diagram showing a current route in the power conversion device shown in embodiment 1 of the present invention.

Operation of the power conversion device in the fourth operation mode, i.e., during the period of t3 to T shown in FIG. 2 will be described. In the fourth operation mode, the semiconductor switching elements 402*a*, 404*a* are ON and the semiconductor switching elements 401*a*, 403*a* are OFF. In the fourth operation mode, as shown in FIG. 6, current i$_{ac}$ flows back from the reactor 3 via the semiconductor switching element 402*a* to the input side. In addition, current circulates through the semiconductor switching element 402*a*, the diode 404*b*, and the transformer 6. In the fourth operation mode, the potential at the stage subsequent to the reactor 3 is fixed at zero by the semiconductor switching element 402*a* becoming ON, and current i$_{ac}$ increases. The DC capacitor 5 is not charged with current and does not discharge current, and therefore V$_{dc}$ is constant. It is noted that, in the fourth operation mode, as in the second operation mode, since the potential difference occurring between both ends of the transformer 6 is small, the amount of power outputted to the secondary side is small and therefore is not taken into consideration here.

As described above, in the first operation mode and the third operation mode, current is inputted to the transformer 6 and power is supplied to the secondary side, while the polarity of the current is inverted between the first operation mode and the third operation mode. By changing these operation modes, AC current is inputted to the transformer 6. The AC power inputted to the primary side of the transformer 6 is subjected to voltage transformation in accordance with the ratio of the numbers of winding turns, and then outputted to the secondary side. At the stage subsequent to the transformer 6, AC power is converted to DC power by the rectification circuit 700, the DC power is smoothed by the smoothing reactor 8 and the smoothing capacitor 9, and the smoothed DC power is supplied to the DC load 10. That is, during the periods of the first operation mode and the third operation mode, DC power can be supplied to the DC load 10.

In the power conversion device shown in embodiment 1 of the present invention, the ON period for the first leg, i.e., the time ratio between the first and second operation modes which correspond to the ON period of the semiconductor switching element 401*a*, and the third and fourth operation modes which correspond to the ON period of the semiconductor switching element 402*a*, is controlled. That is, through control of time t2 in FIG. 2, the ratio between the increase amount and the decrease amount of current i$_{ac}$ flowing through the reactor 3 can be controlled, whereby current i$_{ac}$ flowing through the reactor 3 can be controlled.

In addition, the ON period of the second leg, i.e., the time ratio between the second and third operation modes which correspond to the ON period of the semiconductor switching element 403*a*, and the first and fourth operation modes which correspond to the ON period of the semiconductor switching element 404*a*, is controlled. In addition, a phase shift amount between the ON period for the first leg and the ON period for the second leg, i.e., an amount (phase shift amount) by which the phase of a drive signal for the semiconductor switching element 403*a* is shifted relative to the semiconductor switching element 401*a*, and an amount by which the phase of a drive signal for the semiconductor switching element 404*a* is shifted relative to the semiconductor switching element 402*a*, are controlled, whereby the charge amount and the discharge amount of the DC capacitor 5 are adjusted and thus voltage V$_{dc}$ of the DC capacitor 5 can be controlled to be constant. Alternatively, the difference between AC power taken through the current control as described above and power supplied to the DC load 10 is adjusted, whereby voltage V$_{dc}$ of the DC capacitor 5 is controlled to be constant. This means controlling time t1 and time t3 in FIG. 2. It is noted that, as described later, the period of 0 to t1 and the period of t2 to t3 are set to be equal to each other.

As described above, in the power conversion device shown in embodiment 1, current control using the semiconductor switching element 401*a* and the semiconductor switching element 402*a*, and voltage control for V$_{dc}$, using the semiconductor switching element 403*a* and the semiconductor switching element 404*a*, are performed individually, whereby it is possible to supply DC power to the DC load 10 while achieving current control and voltage control at the same time. Therefore, by performing current control, high-power-factor control for AC power can be performed, i.e., the power factor can be controlled to be approximately 1. In addition, by controlling voltage V$_{dc}$ of the DC capacitor 5 to be constant, output power to the DC load 10 can be controlled. Therefore, in the case where a battery is connected as the DC load, ripple components of unspecified frequencies in the battery current can be reduced, so that charge power with high quality can be supplied.

Here, the way of determining t1, t2, t3 in FIG. 2 will be described. The time t2 is a timing determined by the current control, and a time ratio (duty cycle) D$_{401}$ of the ON period of 0 to t2 of the semiconductor switching element 401*a* with respect to the switching cycle T is represented by expression (1). On the other hand, a time ratio (duty cycle) D$_{402}$ of the ON period t2 to T of the semiconductor switching element 402*a* with respect to the switching cycle T is represented by expression (2).

[Mathematical 1]

$$D_{401} = \frac{v_{ac}}{V_{dc}}. \tag{1}$$

[Mathematical 2]

$$D_{402} = \frac{V_{dc} - v_{ac}}{V_{dc}}. \tag{2}$$

Here, v$_{ac}$ is the voltage of the AC power supply 1, and V$_{dc}$ is the voltage of the DC capacitor 5. Thus, the semiconductor switching element 401*a* and the semiconductor switching element 402*a* are driven with the time ratios based on expression (1) and expression (2), respectively.

First, in the initial state, i.e., a state at the start of battery charge control operation, the phase shift amount for the second leg is set to zero. In the initial state, for making the phase shift amount be zero, rising of the ON state of the semiconductor switching element 403*a* is synchronized with rising of the ON state of the semiconductor switching element 401*a*. Similarly, rising of the ON state of the semiconductor switching element 404a is synchronized with rising of the ON state of the semiconductor switching element 402a. That is, the ON period (gate pulse width) and the phase for the third switching element are set to be equal to those for the first switching element, and the ON period (gate pulse width) and the phase for the fourth switching element are set to be equal to those for the second switching element. In this case, only operations in the second and fourth operation modes are performed, while the periods of the first and third operation modes become zero. The control circuit 11 controls the phase shift amount from this initial state. Thus, in the initial state, supply of power can be mildly started.

For making the phase shift amount be zero, rising of the ON state of the semiconductor switching element 404a may be synchronized with rising of the ON state of the semiconductor switching element 401a. At this time, rising of the ON state of the semiconductor switching element 403a may be synchronized with rising of the ON state of the semiconductor switching element 402a. That is, the ON period (gate pulse width) and the phase for the fourth switching element are set to be equal to those for the first switching element, and the ON period (gate pulse width) and the phase for the third switching element are set to be equal to those for the second switching element. In this case, only operations in the first and third operation modes are performed, while the periods of the second and fourth operation modes become zero. The control circuit 11 controls the phase shift amount from this initial state. Thus, supply of power can be started sharply from the initial state. It is noted that it is not always necessary to make the phase shift amount be zero, but a phase shift amount defined in advance in accordance with requirements in the initial state may be set for the initial state.

As described above, currents with opposite polarities flow through the transformer 6 in the period of the first operation mode and the period of the third operation mode, respectively. Therefore, in order to suppress magnetic bias of the isolation transformer, the overlap period (period of first operation mode) between the semiconductor switching elements 401a and 404a, and the overlap period (period of third operation mode) between the semiconductor switching elements 402a and 403a, are controlled to be equal to each other. That is, the period of 0 to t1 and the period of t2 to t3 in FIG. 2 are equal to each other. It is noted that it is not always necessary to make the period of the first operation mode and the period of the third operation mode equal to each other.

Next, the phase shift amount for the second leg will be described. The phase shift amount for the second leg corresponds to the length of the period of the first operation mode (t0 to t1) in FIG. 2, and here, is represented as a time ratio in conformity with $D_{401}$, $D_{402}$. A phase shift amount $D_{403}$ for the second leg is represented as shown by expression (3). Here, the number of turns on the primary side, i.e., the AC power supply side, of the transformer 6 is defined as N1, and the number of turns on the secondary side, i.e., the DC load side, is defined as N2. In addition, $V_{bat}$ is the voltage of the smoothing capacitor 9. In accordance with the phase shift amount shown by expression (3), the semiconductor switching element 403a and the semiconductor switching element 404a are operated with the same phase shift amount.

[Mathematical 3]

$$D_{403} = \frac{V_{bat}}{V_{dc}} \cdot \frac{N_2}{N_1} \cdot \frac{1}{2} \quad (3)$$

In the power conversion device shown in the present embodiment, $D_{403}$ needs to be always smaller than $D_{401}$ and $D_{402}$. That is, t1 needs to satisfy a relationship of 0≤t1≤t2, and t3 needs to satisfy a relationship of t2≤t3≤T.

Figure 7:
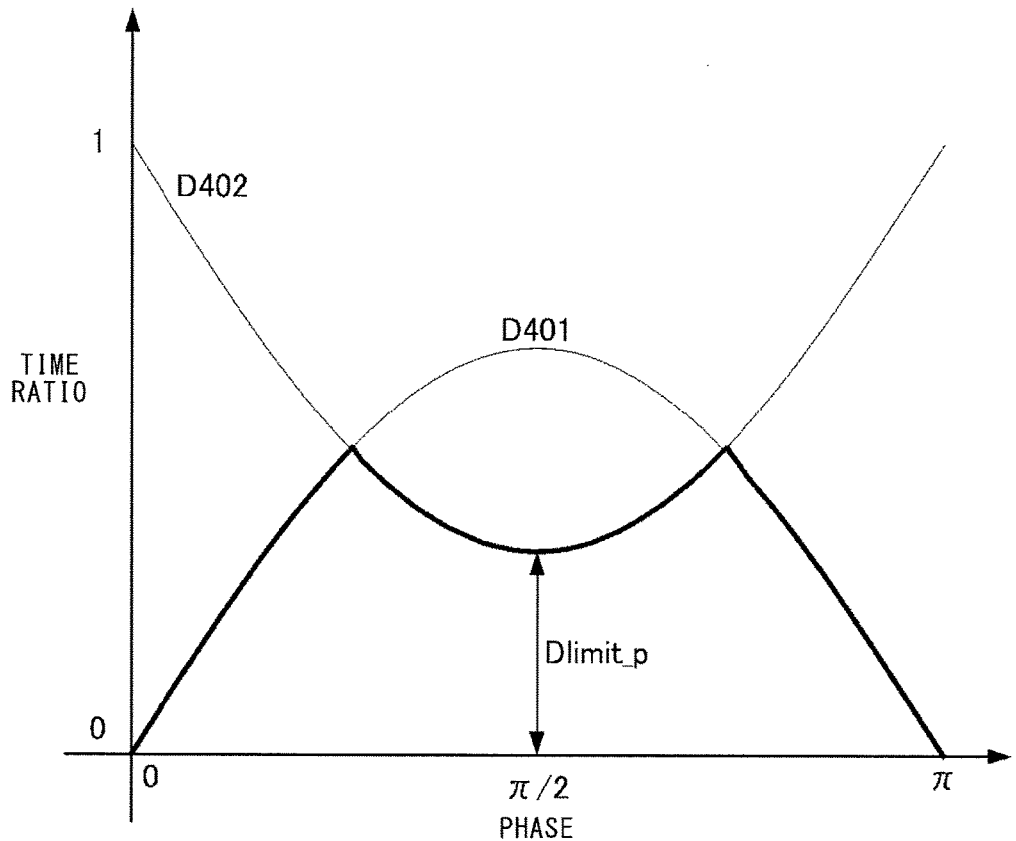
FIG. 7 is a diagram showing the operation principle of the power conversion device shown in embodiment 1 of the present invention.

FIG. 7 shows a schematic duty trajectory diagram of $D_{401}$ and $D_{402}$ satisfying the above relationships. In FIG. 7, the horizontal axis indicates the phase of voltage $V_{ac}$ of the AC power supply 1, and the vertical axis indicates the time ratio of the ON period of each semiconductor switching element with respect to the drive cycle. At phases zero and n of AC voltage, the voltage becomes zero, and in the vicinity thereof, $D_{401}$ infinitely approaches zero, and therefore $D_{401}$ becomes restriction on $D_{403}$. On the other hand, in the vicinity of π/2, $D_{402}$<$D_{401}$ is satisfied, and therefore $D_{402}$ becomes restriction. As a result, the trajectory indicated by a thick line in FIG. 7 becomes a restriction duty $D_{limit}$ which is the upper limit value of $D_{403}$. $D_{limit}$ can be represented by expression (4).

[Mathematical 4]

$$D_{limit} = \min\left\{ \frac{\sqrt{2} V_{ac}}{V_{dc}}, \frac{V_{dc} - \sqrt{2} V_{ac}}{V_{dc}} \right\} \quad (4)$$

If $D_{403}$ is smaller than $D_{limit}$, the current conduction periods of 0 to t1 and t2 to t3 for the transformer 6 can be optionally adjusted and the $V_{dc}$ control can be achieved. In the present embodiment, the control-allowed condition for controlling voltage $V_{dc}$ of the DC capacitor to be constant is that $D_{403}$ is smaller than $D_{limit}$ at the peak phase, i.e., $D_{limit\_p}$. This means that expression (5) is the control-allowed condition.

[Mathematical 5]

$$\frac{V_{bat}}{V_{dc}} \cdot \frac{N_2}{N_1} \cdot \frac{1}{2} < \min\left\{ \frac{\sqrt{2} V_{ac}}{V_{dc}}, \frac{V_{dc} - \sqrt{2} V_{ac}}{V_{dc}} \right\} \quad (5)$$

Figure 8:
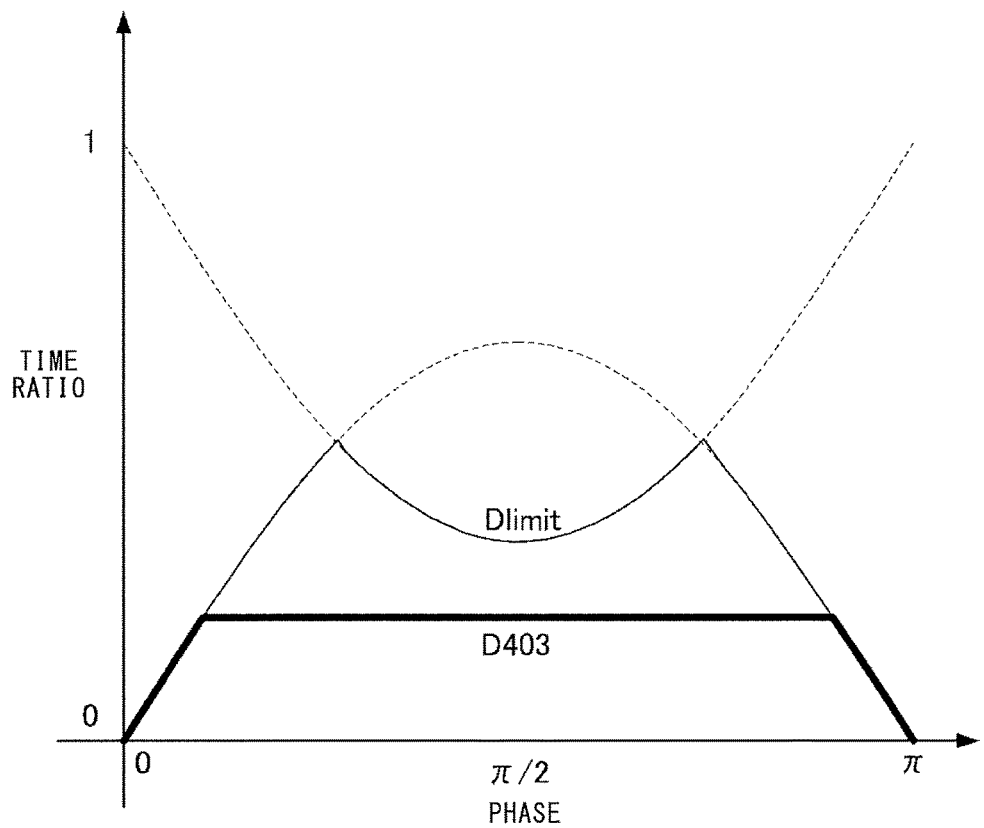
FIG. 8 is a diagram showing the operation principle of the power conversion device shown in embodiment 1 of the present invention.

At a phase near zero, since $D_{limit}$ is in principle infinitely close to zero, the relationship of expression (5) cannot be satisfied. In this case, the command value $D_{403}$ is controlled so as to be equal to or smaller than $D_{limit}$. In this case, the trajectory of $D_{403}$ is as shown in FIG. 8, wherein, when $D_{403}$ is greater than $D_{limit}$, $D_{403}$ is set to $D_{limit}$, and when $D_{403}$ is smaller than $D_{limit}$, $D_{403}$ is set to the value calculated by expression (3). In this case, irrespective of the phase, $D_{403}$ can always be smaller than $D_{limit}$ and thus satisfies the control-allowed condition.

As described above, the phase shift amount $D_{403}$ for the semiconductor switching element 403a and the semiconductor switching element 404a is set to be equal to or smaller than the limit $D_{limit}$ based on $D_{401}$ and $D_{402}$ defined by the current control using the semiconductor switching element $_{401}$a and the semiconductor switching element 402a, whereby the control for making $V_{dc}$ constant is enabled, and thus the high-power-factor control and the output power control can be achieved with a single full-bridge inverter circuit.

It is noted that, even if only the ON periods are controlled for the semiconductor switching elements 403a, 404a, the high-power-factor control and the output power control can be achieved, but a through current occurs in the semiconductor switches and the loss increases. However, by controlling also the phase shift amount for the second leg, the through current can be suppressed and high-efficiency operation by soft-switching operation is enabled.

Since charging and discharging of the DC capacitor 5 are performed in the drive cycle T of the inverter circuit 400, voltage ripple based on the drive cycle occurs. In particular, the voltage ripple is prescribed by the voltage ripple during the charge period in the second operation mode. In general, in a single-phase inverter connected to a single-phase system, voltage ripple having a frequency twice as high as the AC frequency occurs at the DC part. However, in the power conversion device shown in the present embodiment, such voltage ripple having the two-fold frequency does not occur. Therefore, the capacitance of the DC capacitor 5 can be greatly reduced and the DC capacitor 5 can be downsized.

In the power conversion device of the present embodiment, voltage and current of the AC power supply where the power factor becomes 1 are represented as shown by expressions (6), (7). In addition, power $P_{ac}$ of the AC power supply 1 is represented as shown by expression (8). In the power conversion device shown in the present embodiment, $P_{ac}$ represented by expression (8) is entirely transferred to the DC load 10. If the voltage of the DC load 10 is controlled to be constant voltage $V_{bat}$, current $I_{bat}$ supplied to the DC load is defined by expression (9). Therefore, the current flowing into the DC load 10 has a pulsating component having a two-fold AC frequency.

[Mathematical 6]
$$v_{ac} = \sqrt{2} V_{ac} \sin \omega t \quad (6)$$

[Mathematical 7]
$$i_{ac} = \sqrt{2} I_{ac} \sin \omega t \quad (7)$$

[Mathematical 8]
$$P_{ac} = V_{ac} I_{ac}(1 - \cos 2\omega t) \quad (8)$$

[Mathematical 9]
$$I_{bat} = \frac{V_{ac} I_{ac}}{V_{bat}}(1 - \cos 2\omega t) \quad (9)$$

Figure 9:
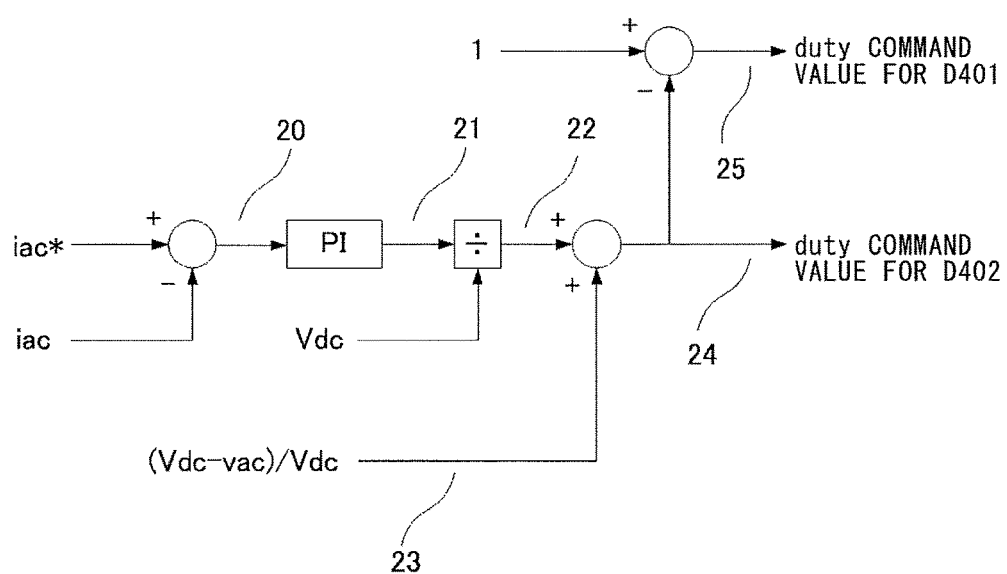
FIG. 9 is a diagram showing a control system of the power conversion device shown in embodiment 1 of the present invention.

Next, the details of a method for the current control using the semiconductor switching element 401a and the semiconductor switching element 402a, i.e., controlling current $i_{ac}$ so as to be a predetermined target sinewave current so that the power factor becomes approximately 1, will be described. FIG. 9 is a control block diagram showing generation of duty command values used for output control for the semiconductor switching element 401a and the semiconductor switching element 402a in the control circuit 11. The control circuit 11 calculates duty command values for controlling the amount of current from the AC power supply 1 and current $i_{ac}$ so that the power factor from the AC power supply 1 becomes approximately 1. First, a current difference 20 between a predetermined current command (target sinewave current) $i_{ac}^*$ having a sinusoidal waveform synchronized with power supply voltage $V_{ac}$, and current $i_{ac}$ detected by the current detector, is calculated. Using the calculated current difference 20 as a feedback amount, PI control is performed to obtain output 21. Next, the output 21 is divided by voltage $V_{dc}$ of the DC capacitor 5 detected by the voltage detector, whereby a duty command value 22 for the semiconductor switching element 402a is calculated.

A feedforward term 23 is added to the duty command value 22. Here, the feedforward term 23 is a value represented by expression (2) and is determined per drive cycle in accordance with the phase of the AC power supply 1. A duty command value 24 obtained by adding the feedforward term 23 is used as a duty command value for the semiconductor switching element 402a. In addition, a duty command value 25 obtained by subtracting the duty command value 24 for the semiconductor switching element 402a from 1 is used as a duty command value for the semiconductor switching element 401a.

Figure 10:
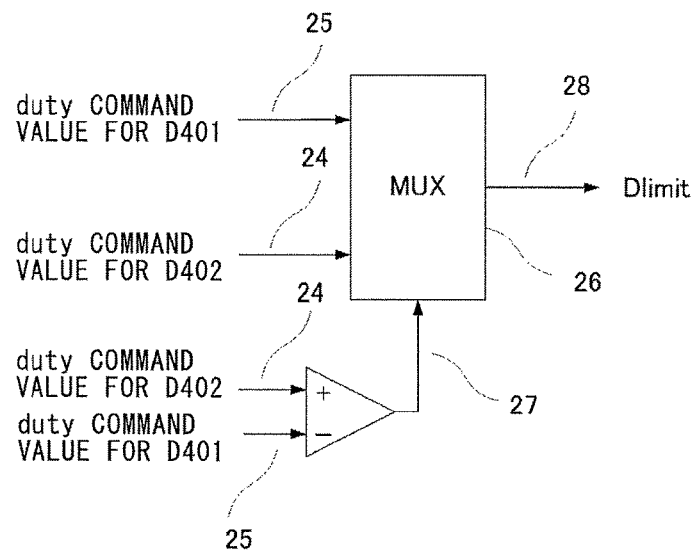
FIG. 10 is a diagram showing the control system of the power conversion device shown in embodiment 1 of the present invention.

FIG. 10 is a calculation block diagram for $D_{limit}$ calculated on the basis of the duty command value 24 for the semiconductor switching element 402a and the duty command value 25 for the semiconductor switching element 401a. A duty selector (MUX) 26 selects the duty command value 24 or the duty command value 25 as $D_{limit}$ in accordance with the magnitude relationship between the duty command value 24 for $D_{402}$ and the duty command value 25 for $D_{401}$. That is, if the duty command value 25 is greater than the duty command value 24, a comparison signal 27 is outputted at L level, so that the duty selector 26 selects the duty command value 24 as $D_{limit}$ 28. On the other hand, if the duty command value 24 is greater than the duty command value 25, the comparison signal 27 is outputted at H level, so that the duty selector 26 selects the duty command value 25 as $D_{limit}$ 28.

Figure 11:
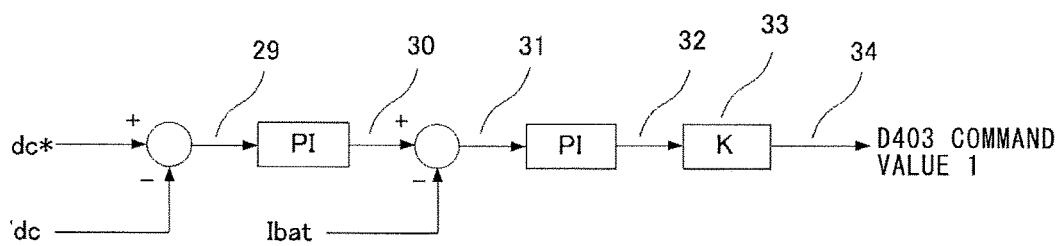
FIG. 11 is a diagram showing the control system of the power conversion device shown in embodiment 1 of the present invention.

FIG. 11 is a control block diagram showing generation of a $D_{403}$ command value in the control for making voltage $V_{dc}$ of the DC capacitor 5 constant by the semiconductor switching element 403a and the semiconductor switching element 404a. The $D_{403}$ command value for adjusting the output power of the semiconductor switching element 403a and the semiconductor switching element 404a to control the voltage $V_{dc}$ of the DC capacitor 5 so as to be constant, is calculated.

First, a difference 29 between a predetermined DC voltage command value $V_{dc}^*$ for the DC capacitor 5 and voltage $V_{dc}$ detected by the voltage detector is calculated. Here, the DC voltage command value $V_{dc}^*$ is set to a voltage value higher than the peak voltage of AC voltage inputted from the AC power supply. Using this difference 29 as a feedback amount, PI control is performed to obtain an output current command value 30 for the DC load 10. Using a difference value 31 between the output current command value 30 and a detection value $I_{bat}$ of DC current as a feedback amount, PI control is performed and a calculation result 32 thereof is inputted to a gain adjuster 33, to generate the $D_{403}$ command value 34.

Figure 12:
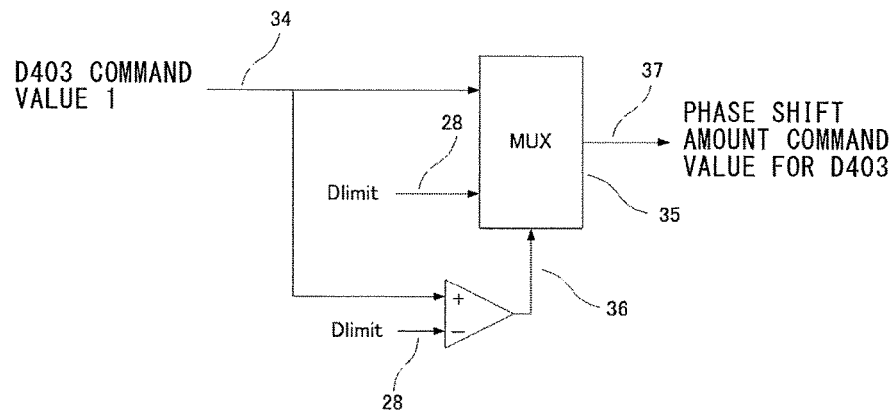
FIG. 12 is a diagram showing the control system of the power conversion device shown in embodiment 1 of the present invention.

FIG. 12 is a calculation block diagram in which a phase shift amount command value for the semiconductor switching element 403a and the semiconductor switching element 404a is generated from the $D_{403}$ command value 34 calculated in the calculation block diagram shown in FIG. 11 and $D_{limit}$ 28 calculated in the calculation block shown in FIG. 10. First, the $D_{403}$ command value 34 and the $D_{limit}$ 28 are inputted to a selector (MUX) 35. The selector 35 selects the $D_{403}$ command value 34 or the $D_{limit}$ 28 in accordance with a calculation result 36 of magnitude comparison between the $D_{403}$ command value 34 and the $D_{limit}$ 28. If the $D_{403}$ command value 34 is smaller than $D_{limit}$ 28, the $D_{403}$ command value 34 is used as a phase shift amount command value 37 for $D_{403}$. On the other hand, if the $D_{403}$ command value 34 is greater than $D_{limit}$ 28, $D_{limit}$ 28 is used as the phase shift amount command value 37 for $D_{403}$. In this way, the phase shift amount command value 37 for $D_{403}$ for the semiconductor switching element 403a and the semiconductor switching element 404a can be always made equal to or smaller than $D_{limit}$ 28, and thus the control-allowed condition for $V_{dc}$ control can be satisfied.

Next, processes for generating a gate signal for the semiconductor switching element $_{401}$a generated from the duty command value 25 for $D_{401}$, a gate signal for the semiconductor switching element 402a generated from the duty command value 24 for $D_{402}$, and gate signals for the semiconductor switching element 403a and the semiconductor switching element 404a generated from the phase shift amount command value 37 for $D_{403}$, will be described. In the present embodiment, the case of generating these gate signals using a saw-tooth wave as a carrier wave will be described.

Figure 13:
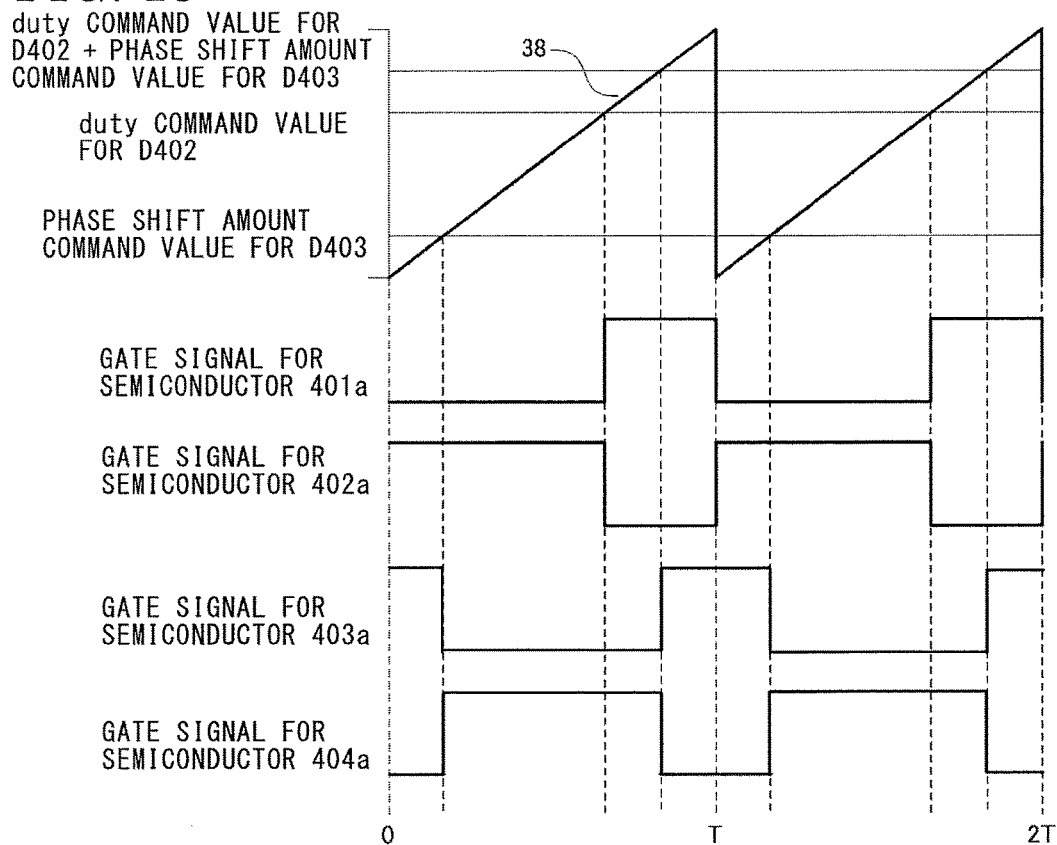
FIG. 13 is a diagram showing the operation principle of the power conversion device shown in embodiment 1 of the present invention.
Figure 14:
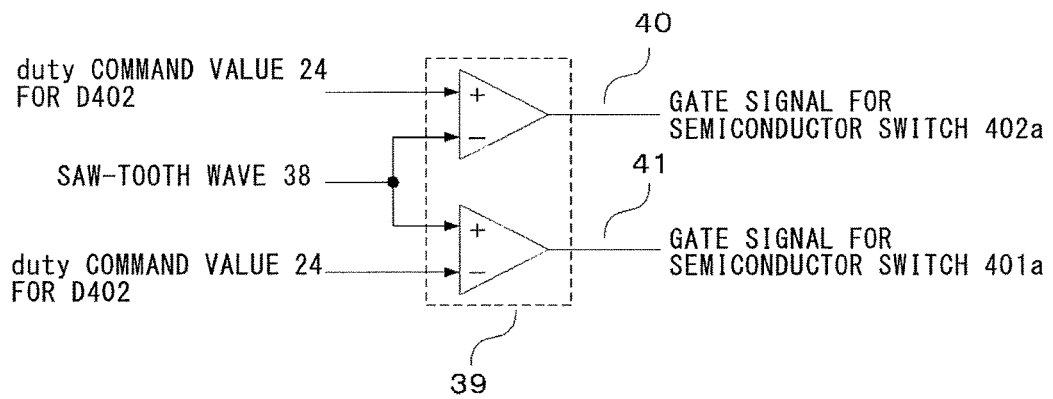
FIG. 14 is a diagram showing the control system of the power conversion device shown in embodiment 1 of the present invention.
Figure 15:
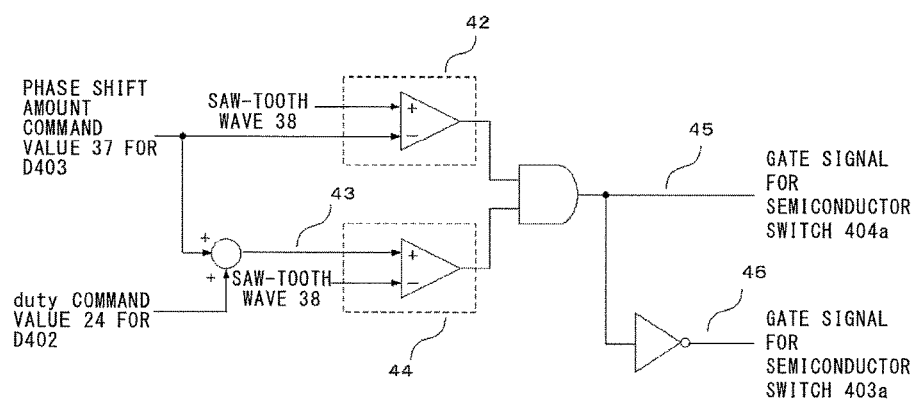
FIG. 15 is a diagram showing the control system of the power conversion device shown in embodiment 1 of the present invention.

FIG. 13 shows the relationship among a saw-tooth wave 38 as a carrier wave, the duty command value 25 for $D_{401}$, the duty command value 24 for $D_{402}$, the phase shift amount command value 37 for $D_{403}$, and gate signals for the semiconductor switching elements 401a to 404a. FIG. 14 shows a calculation block diagram for generating the gate signals for the semiconductor switching element 401a and the semiconductor switching element 402a. FIG. 15 shows a calculation block diagram for generating the gate signals for the semiconductor switching element 403a and the semiconductor switching element 404a. The used saw-tooth waves have the same value and the same phase for the four elements of semiconductor switching elements 401a to 404a.

As shown in FIG. 14, the duty command value 24 for $D_{402}$ and the saw-tooth wave 38 are inputted to a gate signal generator 39. As shown in FIG. 13, as a result of comparison between the duty command value 24 for $D_{402}$ and the saw-tooth wave 38, if the duty command value 24 for $D_{402}$ is greater than the saw-tooth wave 38, a gate signal 40 for the semiconductor switching element 402a that turns on the semiconductor switching element 402a is generated. As a result of comparison between the duty command value 24 for $D_{402}$ and the saw-tooth wave 38, if the duty command value 24 for $D_{402}$ is smaller than the saw-tooth wave 38, a gate signal 41 for the semiconductor switching element 401a that turns on the semiconductor switching element 401a is generated. In this way, for the semiconductor switching element 401a and the semiconductor switching element 402a, the gate signals for the semiconductor switching element 401a and the semiconductor switching element 402a are generated on the basis of the duty command value 24 for $D_{401}$ and the duty command value 25 for $D_{402}$ calculated by the high-power-factor control.

As shown in FIG. 15, the phase shift amount command value 37 for $D_{403}$ and the saw-tooth wave 38 are inputted to a gate signal generator 42. In addition, a phase shift amount signal 43 obtained by summing the phase shift amount command value 37 for $D_{403}$ and the duty command value 24 for $D_{402}$, and the saw-tooth wave 38 are inputted to a gate signal generator 44. A signal representing a logical conjunction of a comparison signal between the phase shift amount signal 43 and the saw-tooth wave 38 and a comparison signal between the saw-tooth wave 38 and the phase shift amount command value 37 for $D_{403}$, is used as a gate signal 45 for the semiconductor switching element 404a. A signal representing a negation of the gate signal 45 is used as a gate signal 46 for the semiconductor switching element 403a. As described above, the gate signals for the semiconductor switching elements 401a to 404a can be generated.

Figure 16:
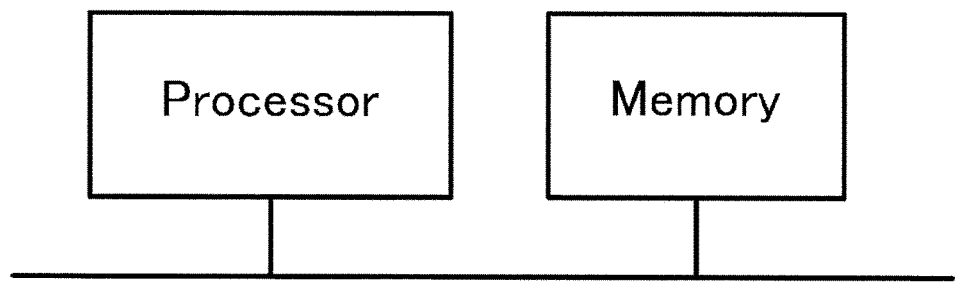
FIG. 16 is a block diagram showing the hardware configuration of a control circuit shown in embodiment 1 of the present invention.

The calculation block diagrams shown in FIGS. 9 to 12 and 14 may be implemented by hardware using a calculation circuit, or as shown in FIG. 16, may be implemented by software, using a memory storing a program, and a processor for processing the program.

In the present embodiment, the case of not providing a dead time between the ON period of the semiconductor switching element 401a and the ON period of the semiconductor switching element 402a has been shown. However, the dead time may be provided. Similarly, a dead time may be provided between the semiconductor switching element 403a and the semiconductor switching element 404a.

In the present embodiment, one terminal of the reactor 3 is connected to the positive-side DC output terminal of the rectification circuit 200, and the other terminal of the reactor 3 is connected to the first AC end which is the connection point between the semiconductor switching element 401a and the semiconductor switching element 402a, whereby high-power-factor control is performed using the semiconductor switching elements 401a, 402a. However, the other terminal of the reactor 3 may be connected to the connection point between the semiconductor switching elements 403a and 404a, to perform high-power-factor control using the semiconductor switching elements 403a, 404a. In this case, it suffices that the gate signal to be inputted to the semiconductor switching element 401a is inputted to the semiconductor switching element 403a, and the gate signal to be inputted to the semiconductor switching element 402a is inputted to the semiconductor switching element 404a.

In the case where the reactor 3 is connected to the negative side output DC terminal of the diode rectification circuit or the reactors 3 are distributed and connected to the positive-side and negative-side output DC terminals of the diode rectification circuit, high-power-factor control is performed using the semiconductor switching elements 401a, 402a, and output power control is performed using the semiconductor switching element 403a and the semiconductor switching element 404a.

In the present embodiment, as described above, the ON duties for the semiconductor switching element 401a and the semiconductor switching element 402a are controlled in accordance with the current command value, whereby input current from the AC power supply 1 is adjusted to a predetermined current value and thus the power factor can be controlled to be approximately 1. At the same time, the phase shift amount for the semiconductor switching element 403a and the semiconductor switching element 404a is changed so that DC voltage $V_{dc}$ of the DC capacitor 5 follows target voltage, whereby DC voltage of the DC capacitor 5 is controlled to be constant, and thus the output power to the DC load can be controlled.

In the configuration of a single full-bridge inverter, the functions of high-power-factor control and output power control are separated for the respective legs, whereby it becomes possible to achieve both high-power-factor control and output power control by a single full-bridge inverter, and thus the entire circuit can be downsized as compared to a conventional method in which two general power converters are provided to achieve high-power-factor control and output power control individually.

The power pulsation pulsating at a frequency twice as high as the AC power supply frequency occurring at the AC power supply 1 is entirely transferred to the DC load 10, and at the DC capacitor 5, voltage ripple occurs only by charging and discharging due to the switching cycle T. In this case, the DC capacitor 5 does not need to bear the power pulsation having a frequency twice as high as the AC power supply frequency, and as compared to the method in which two general power converters are provided and a capacitor is provided at a link portion between the two power converters, the DC capacitor 5 only has to bear charging and discharging due to the switching cycle T. Therefore, the capacitance needed for the DC capacitor 5 can be greatly reduced and the DC capacitor 5 can be downsized.

In addition, the period during which the ON states of the semiconductor switching element 401a and the semiconductor switching element 404a overlap each other, and the period during which the ON states of the semiconductor switching element 402a and the semiconductor switching element 404a overlap each other, are set to be equal to each other, so as to suppress magnetic bias of the transformer 6, whereby more reliable control can be achieved.

Embodiment 2

In embodiment 1, a saw-tooth wave is used as the carrier signal for ON period control in generation of the gate signals for the semiconductor switching elements 401a to 404a. In embodiment 2, the case of using a triangular wave as the carrier signal for ON period control will be described.

The circuit configuration of the power conversion device and the control method in the present embodiment are the same as those shown in embodiment 1, and the description thereof is omitted. In addition, the duty command value 25 for $D_{401}$, the duty command value 24 for $D_{402}$, and the phase shift amount command value 37 for $D_{403}$ are calculated by the same method as in embodiment 1. That is, the present embodiment is the same as embodiment 1 except for the operation for generating gate signals for the semiconductor switching elements shown in FIGS. 13 to 15.

Processes for generating a gate signal for the semiconductor switching element 401a generated from the duty command value 25 for $D_{401}$, a gate signal for the semiconductor switching element 402a generated from the duty command value 24 for $D_{402}$, and gate signals for the semiconductor switching element 403a and the semiconductor switching element 404a generated from the phase shift amount command value 37 in the present embodiment, will be described.

Figure 17:
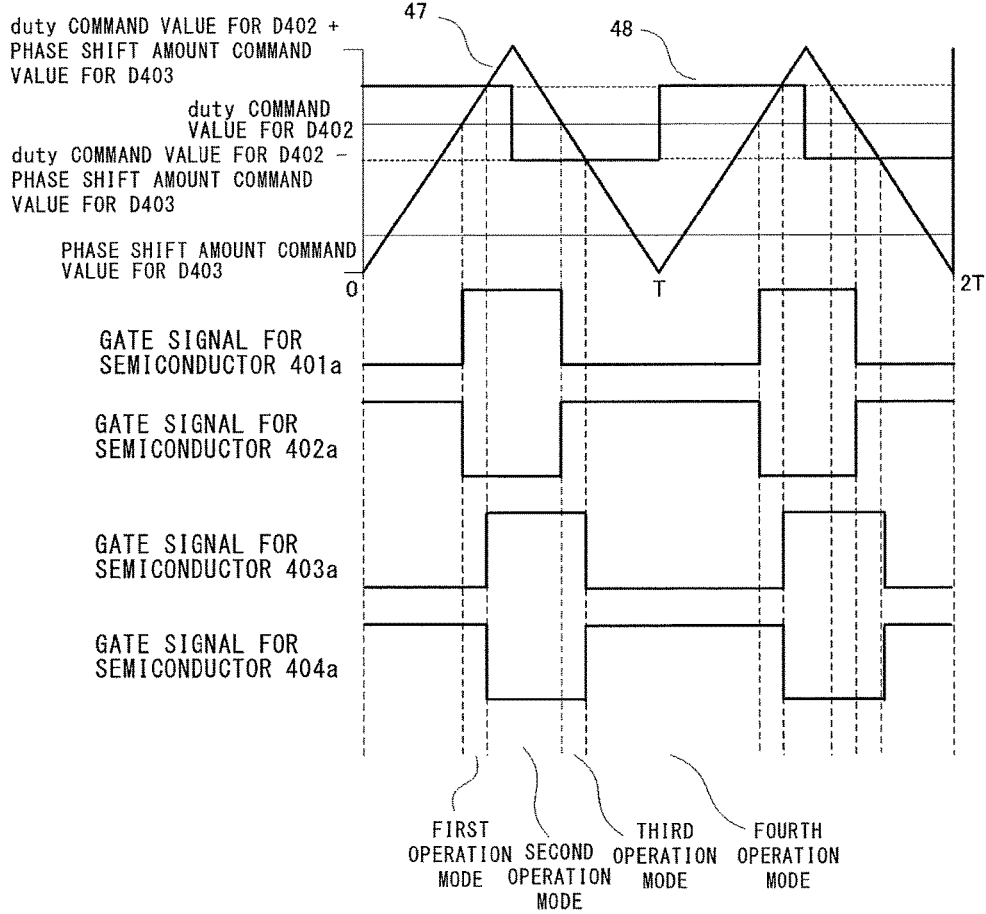
FIG. 17 is a diagram showing the operation principle of a power conversion device shown in embodiment 2 of the present invention.

FIG. 17 shows the relationship among a carrier wave 47, the duty command value 25 for $D_{401}$, the duty command value 24 for $D_{402}$, the phase shift amount command value 37 for $D_{403}$, and gate signals for the semiconductor switching elements 401a to 404a. The carrier wave 47 is a triangular wave, and the same triangular wave is used for generating the gate signals for the semiconductor switching elements 401a to 404a.

On the basis of the magnitude relationship between the triangular wave 47, and a rectangular wave 48 of which the amplitude from the duty command value 24 for $D_{402}$ as a reference is equal to the phase shift amount command value for $D_{403}$, the phase for the semiconductor switching element 403a is shifted relative to the semiconductor switching element 401a, and the phase for the semiconductor switching element 404a is shifted relative to the semiconductor switching element 402a. The value of the rectangular wave is switched between the mountain and valley of the triangular wave. In this case, the first to fourth operation modes defined in FIG. 2 are newly defined as shown in FIG. 17, but the newly defined operation modes are configured in the same manner as the four operation modes defined in embodiment 1, whereby high-power-factor control is performed using the semiconductor switching element 401a and the semiconductor switching element 402a, and output power control is performed using the semiconductor switching element 403a and the semiconductor switching element 404a.

Instead of the rectangular wave 48, two DC signals having the same values as the rectangular wave amplitudes may be used, and the signal to be used for magnitude comparison is switched at the mountain/valley timing of the triangular wave 47, so as to realize a pseudo rectangular wave.

Figure 18:
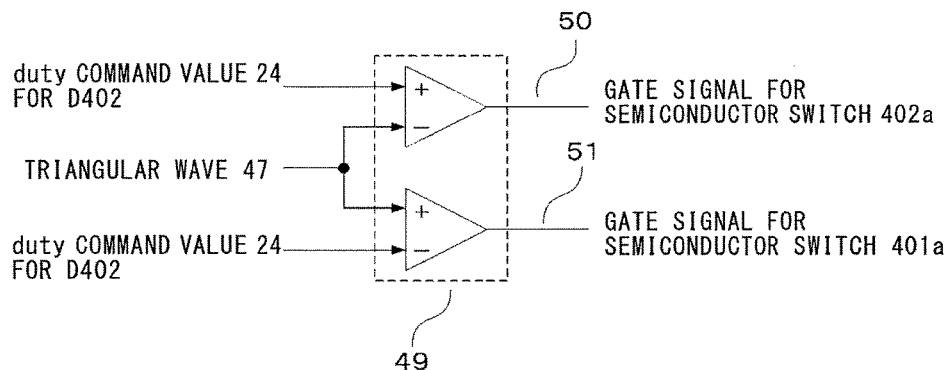
FIG. 18 is a diagram showing a control system of the power conversion device shown in embodiment 2 of the present invention.

FIG. 18 shows a block diagram for generating the gate signal for the semiconductor switching element 401a and the gate signal for the semiconductor switching element 402a, from the duty command value 25 for $D_{401}$ and the duty command value 24 for $D_{402}$. The duty command value 24 for $D_{402}$ and the triangular wave 47 are inputted to a gate signal generator 49. A gate signal 50 for the semiconductor switching element 402a is generated so as to turn on the semiconductor switching element 402a during a period in which the duty command value 24 for $D_{402}$ is greater than the triangular wave 47. On the other hand, a gate signal 51 for the semiconductor switching element 401a is generated so as to turn on the semiconductor switching element 401a during a period in which the duty command value 24 for $D_{402}$ is smaller than the triangular wave 47.

Figure 19:
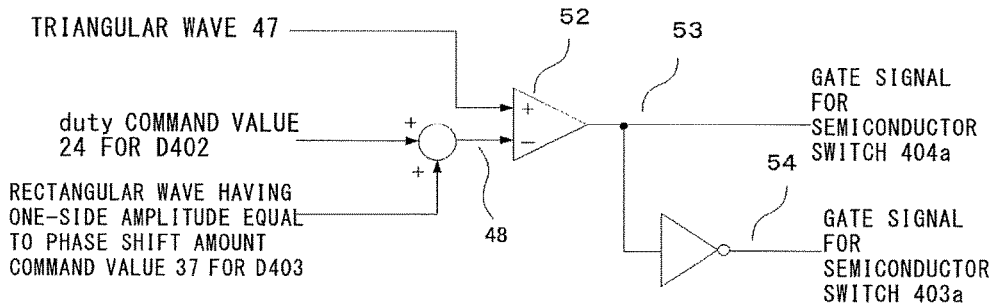
FIG. 19 is a diagram showing the control system of the power conversion device shown in embodiment 2 of the present invention.

FIG. 19 is a calculation block diagram showing a method for generating the gate signals for the semiconductor switching elements 403a, 404a. As shown in FIG. 19, first, the duty command value 24 for $D_{402}$ is added to the rectangular wave 48 having one-side amplitude equal to the phase shift amount command value 37 for $D_{403}$, thereby generating the rectangular wave 48. Next, the generated rectangular wave 48 and the triangular wave 47 are inputted to a comparator 52. A calculation result 53 of comparison between the rectangular wave 48 and the triangular wave 47 is used as the gate signal for the semiconductor switching element 404a. In addition, a signal 54 representing a negation of the calculation result 53 is used as the gate signal for the semiconductor switching element 403a. As described above, the gate signals for the semiconductor switching elements 401a to 404a can be generated.

In the present embodiment, since the configuration and the control as described above are used, it is possible to achieve high-power-factor control and output power control at the same time by a single stage of full-bridge inverter circuit, as in the power conversion device shown in embodiment 1.

Embodiment 3

In the power conversion devices shown in embodiments 1 and 2, during the flow-back period (second operation mode or fourth operation mode) in which the semiconductor switching elements 401a and 403a or the semiconductor switching elements 402a and 404a become ON, since a potential difference occurring between both ends of the transformer 6 is small, the amount of output to the secondary side is small and therefore is not taken into consideration. In the present embodiment, a power conversion device that enables more stable operation while considering a potential difference occurring between both ends of the transformer 6 will be described. It is noted that the configuration of the power conversion device shown in the present embodiment is the same as that shown in FIG. 1 and the description thereof is omitted.

Figure 20:
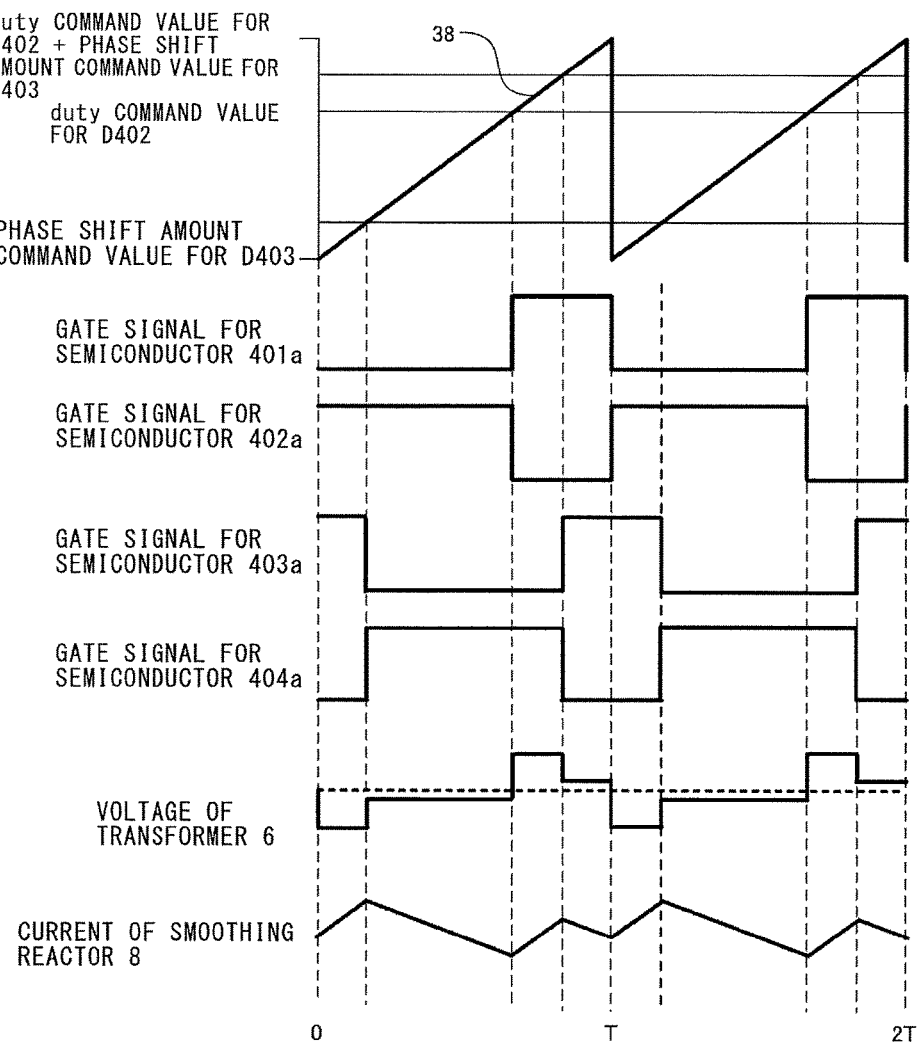
FIG. 20 is a diagram showing the operation principle of a power conversion device shown in embodiment 3 of the present invention.

FIG. 20 shows the relationship among the saw-tooth wave 38 as a carrier wave, the duty command value 25 for $D_{401}$, the duty command value 24 for $D_{402}$, the phase shift amount command value 37 for $D_{403}$, the gate signals for the semiconductor switching elements 401a to 404a, voltage of the transformer 6, and current of the smoothing reactor 8, in the case of considering minute voltage between both ends of the transformer 6 occurring in the second operation mode and the fourth operation mode. As shown in FIG. 20, even during the flow-back periods, minute voltage occurs between both ends of the transformer 6.

Figure 21:
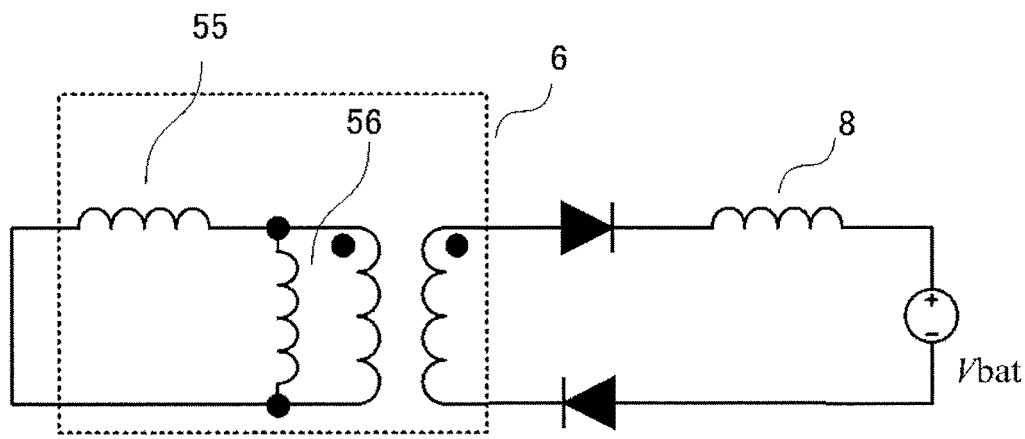
FIG. 21 is a diagram showing a simple equivalent circuit of the power conversion device shown in embodiment 3 of the present invention.

FIG. 21 shows a simple equivalent circuit during the flow-back period in which the semiconductor switching elements 401a and 403a or the semiconductor switching elements 402a and 404a become ON. At this time, voltage $V_{tr\_p}$ between both ends of the transformer 6 is represented as shown by the following expression (10). It is noted that the forward-direction voltage of the diodes 701 to 704 is defined as $V_f$, the leakage inductance of the transformer 6 is defined as $L_k$, and the inductance value of the smoothing reactor 8 is defined as Lf. It is noted that a leakage inductance 55 and an excitation inductance 56 of the transformer 6 may be replaced with an external reactor.

[Mathematical 10]

$$V_{tr\_p} = \frac{N_1}{N_2} \frac{V_{bat} + 2V_f}{1 + \frac{L_f}{L_k}\left(\frac{N_1}{N_2}\right)^2} \quad (10)$$

As shown in FIG. 20 and expression (10), in the case of considering minute voltage between both ends of the transformer 6, a product of voltage of the transformer 6 and time, and the time integral value of current of the smoothing reactor 8, are deviated. Therefore, in usage for large power capacity, a magnetic bias phenomenon can occur. In order to suppress the magnetic bias phenomenon without changing the specifications of passive elements such as the transformer and the reactor, it is necessary to eliminate deviation of a product of voltage of the transformer 6 and time and deviation of the time integral value of current of the smoothing reactor 8. Accordingly, in the power conversion device shown in the present embodiment, the power transmission period (first operation mode and third operation mode) and the flow-back period (second operation mode and fourth operation mode) are corrected to reduce deviation of a product of voltage of the transformer 6 and time and deviation of the time integral value of current of the smoothing reactor 8. Hereinafter, the details thereof will be described.

The control circuit 11 calculates the time ratio (duty cycle) $D_{401}$ for the semiconductor switching element 401a, the time ratio (duty cycle) $D_{402}$ for the semiconductor switching element 402a, and the phase shift amount $D_{403}$ for the second leg, by the same method as in embodiment 1 and embodiment 2. In the power conversion device shown in the present embodiment, these calculated values are corrected.

Figure 22:
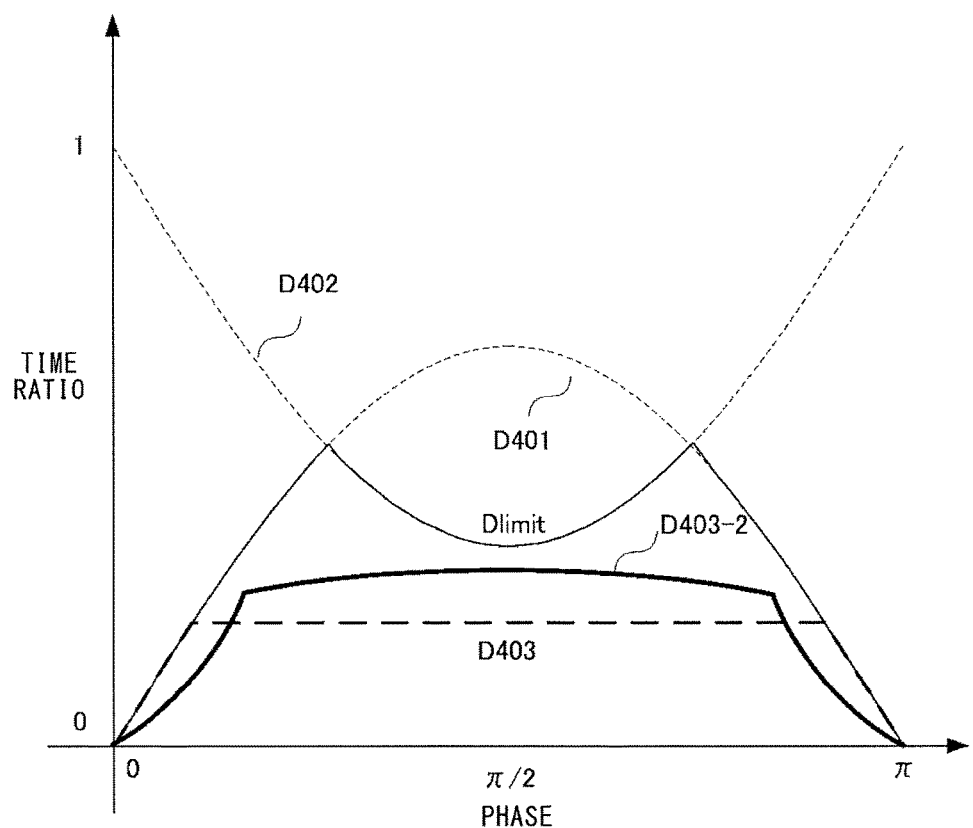
FIG. 22 is a diagram showing the operation principle of the power conversion device shown in embodiment 3 of the present invention.
Figure 23:
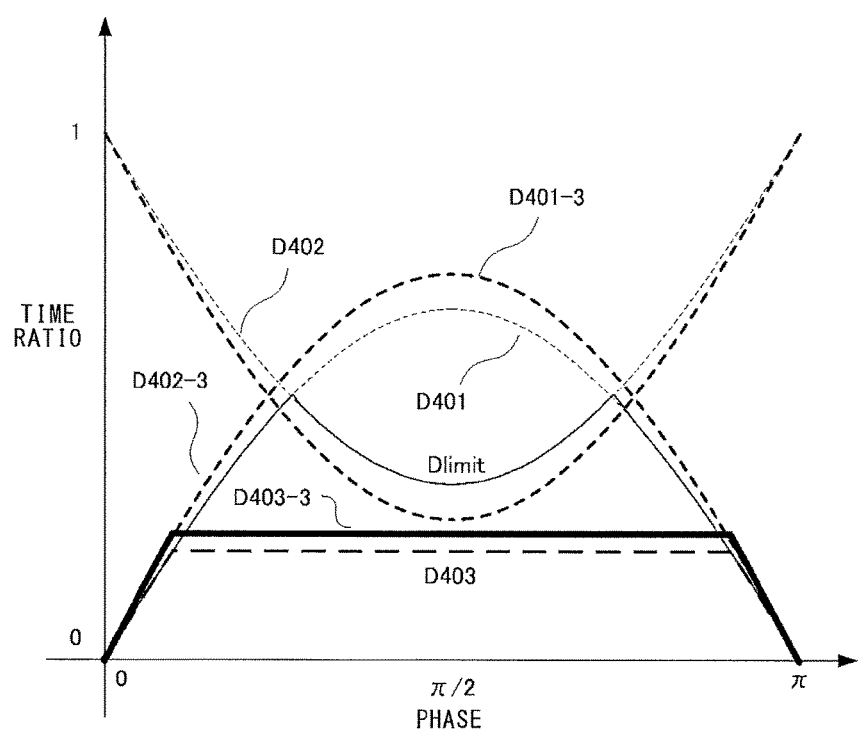
FIG. 23 is a diagram showing the operation principle of the power conversion device shown in embodiment 3 of the present invention.

FIG. 22 shows a schematic duty trajectory diagram in the case where the phase shift amount $D_{403}$ for the second leg composed of the semiconductor switching element 403a and the semiconductor switching element 404a is corrected. In FIG. 22, the phase shift amount for the second leg is corrected as shown by a trajectory indicated by $D_{403}$-2. As shown in FIG. 22, the phase shift amount for the second leg is corrected, whereby the ON period and the phase shift amount for each of the semiconductor switching element 403a and the semiconductor switching element 404a are changed. Thus, it becomes possible to suppress deviation of a product of voltage of the transformer 6 and time and deviation of the time integral value of current of the smoothing reactor 8. The correction period in the power transmission period at this time is defined as ΔT. In addition, for ΔT, a polarity of increasing the power transmission period of the semiconductor switching element 402a and the semiconductor switching element 403a is defined as positive. As the correction method, using the center of the gate signal phase of each of the semiconductor switching element 403a and the semiconductor switching element 404a as a reference, both ends thereof are each increased or decreased by ΔT/2. Instead of decreasing both ends by ΔT/2, one of the pulse ends may be increased or decreased by ΔT. It is noted that, as shown in FIG. 23, the duty cycle (ON period) for the first leg composed of the semiconductor switching element 401a and the semiconductor switching element 402a may be corrected.

By suppressing deviation of the time integral value of current of the smoothing reactor 8, deviation of a product of voltage of the transformer 6 and time is also suppressed. Therefore, the control method using the time integral value of current of the smoothing reactor 8 will be described.

Figure 24:
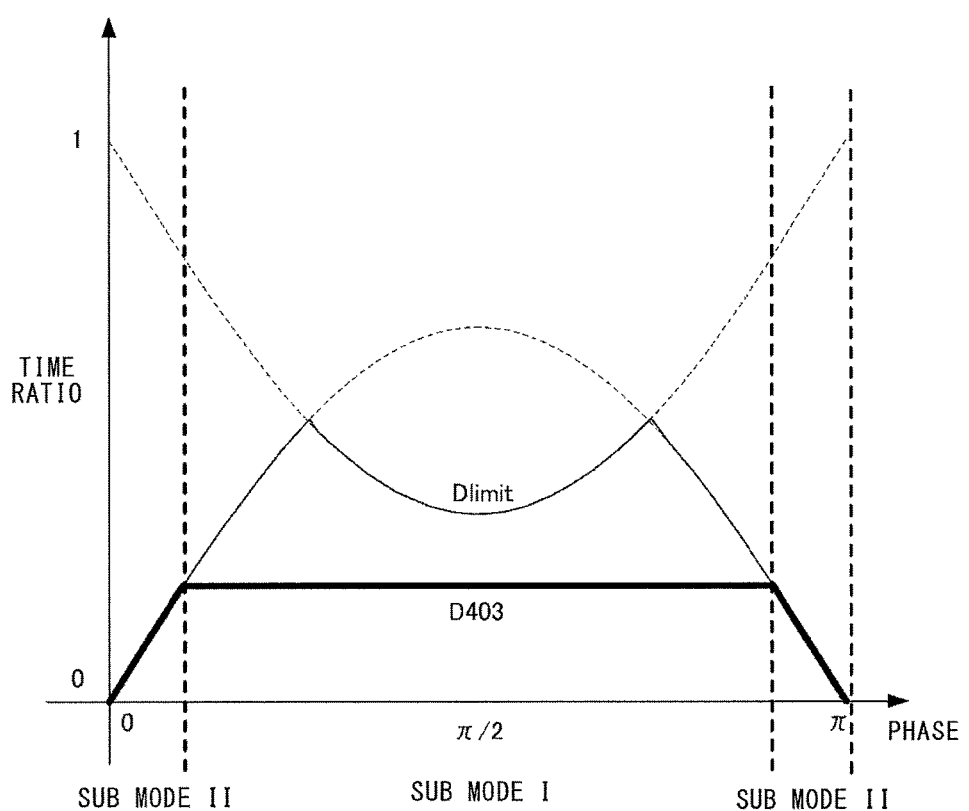
FIG. 24 is a diagram showing the operation principle of the power conversion device shown in embodiment 3 of the present invention.
Figure 25:
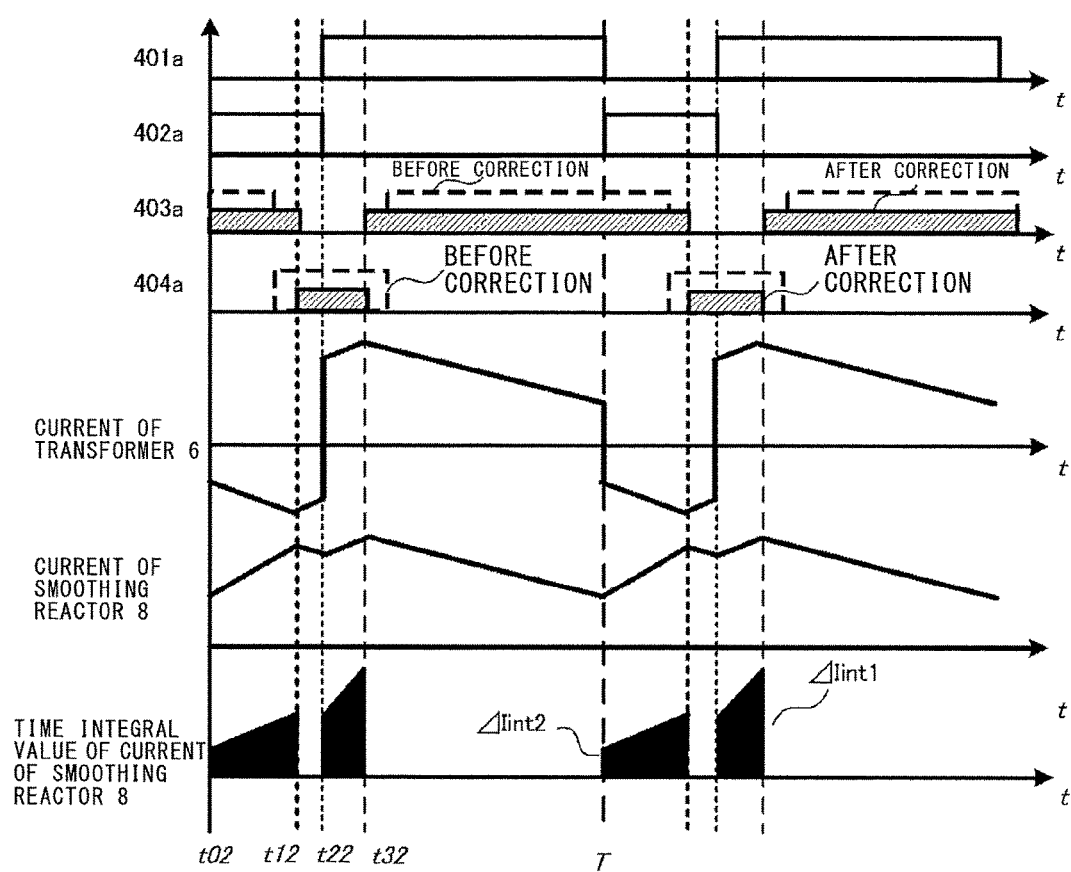
FIG. 25 is a diagram showing the operation principle of the power conversion device shown in embodiment 3 of the present invention.

As shown in FIG. 24, a period during which the phase shift amount $D_{403}$ is smaller than $D_{limit}$ is defined as a first operation sub mode, and a period during which $D_{403}$ is equal to or greater than $D_{limit}$ is defined as a second operation sub mode. First, the case of considering a correction period ΔT1 for the power transmission period in the first operation sub mode will be described. As shown in FIG. 25, in the case of considering the correction period ΔT1, the ON timing of the semiconductor switching element 402a is denoted by t02, and the OFF timing of the semiconductor switching element 403a is denoted by t12. In addition, the ON timing of the semiconductor switching element 401a is denoted by t22, and the OFF timing of the semiconductor switching element 404a is denoted by t32. In this case, operation modes can be classified into four operation modes of t02 to t12, t12 to t22, t22 to t32, and t32 to T.

A time integral value of current of the smoothing reactor 8 over the period during which the semiconductor switching elements 401a and 404a are ON is defined as $\Delta T_{int1}$, and a time integral value of current of the smoothing reactor 8 over the period during which the semiconductor switching elements 402a and 403a are ON is defined as $\Delta T_{int2}$.

The above four operation mode periods can be represented as shown by the following expressions (11) to (14). It is noted that the initial time t02 is set at 0.

[Mathematical 11]

$$t_{12} = D_{403}T + \frac{\Delta T_1}{2}. \quad (11)$$

[Mathematical 12]

$$t_{22} - t_{12} = (D_{402} - D_{403})T - \frac{\Delta T_1}{2}. \quad (12)$$

[Mathematical 13]

$$t_{32} - t_{22} = D_{403}T - \frac{\Delta T_1}{2}. \quad (13)$$

[Mathematical 14]

$$T - t_{32} = (1 - D_{402} - D_{403})T + \frac{\Delta T_1}{2}. \quad (14)$$

In this case, initial current $i_{Lf}$ of the smoothing reactor 8 in each operation mode can be represented as follows.

[Mathematical 15]

$$i_{Lf}(t_{12}) = \frac{\frac{N_2}{N_1}V_{dc} - V_{bat}}{L_f}\left(D_{403}T + \frac{\Delta T_1}{2}\right) + i_{Lf}(0) \quad (15)$$

[Mathematical 16]

$$i_{Lf}(t_{22}) = \frac{-V_{bat}}{L_f}\left\{(D_{402} - D_{403})T - \frac{\Delta T_1}{2}\right\} + i_{Lf}(t_{12}) \quad (16)$$

[Mathematical 17]

$$i_{Lf}(t_{32}) = \frac{\frac{N_2}{N_1}V_{dc} - V_{bat}}{L_{bat}}\left(D_{403}T - \frac{\Delta T_1}{2}\right) + i_{Lf}(t_{22}) \quad (17)$$

[Mathematical 18]

$$i_{Lf}(T) = \frac{-V_{bat}}{L_f}\left\{(1 - D_{402} - D_{403})T + \frac{\Delta T_1}{2}\right\} + i_{Lf}(t_{32}) \quad (18)$$

From the above, each time integral value of current of the smoothing reactor 8 can be represented by expression (19) and expression (20).

[Mathematical 19]

$$\begin{aligned}\Delta I_{int1} &= \frac{1}{2}\{i_{Lf}(t_{32}) + i_{Lf}(t_{22})\}\left(D_{403}T - \frac{\Delta T_1}{2}\right) \\ &= \frac{1}{2L_f}\Bigg[\left(\frac{N_2}{N_1}V_{dc} - V_{bat}\right)\left(D_{403}T - \frac{\Delta T_1}{2}\right)^2 - 2V_{bat}D_{402}T + \\ &\quad 2\frac{N_2}{N_1}V_{dc}\left\{(D_{403}T)^2 - \left(\frac{\Delta T_1^2}{2}\right)\right\} + 2L_f i_{Lf}(0)\left(D_{403}T - \frac{\Delta T_1}{2}\right)\Bigg]\end{aligned} \quad (19)$$

[Mathematical 20]

$$\begin{aligned}\Delta I_{int2} &= \frac{1}{2}\{i_{Lf}(t_{12}) + i_{Lf}(0)\}\left(D_{403}T + \frac{\Delta T_1}{2}\right) \\ &= \frac{1}{2L_f}\Bigg[\left(\frac{N_2}{N_1}V_{dc} - V_{bat}\right)\left(D_{403}T + \frac{\Delta T_1}{2}\right)^2 + \\ &\quad 2L_f i_{Lf}(0)\left(D_{403}T + \frac{\Delta T_1}{2}\right)\Bigg]\end{aligned} \quad (20)$$

From expression (19) and expression (20), deviation $\Delta I_{int}$ of the time integral value of current of the smoothing reactor 8 is represented as follows.

[Mathematical 21]

$$\begin{aligned}\Delta I_{int} &= \Delta I_{int2} - \Delta I_{int1} \\ &= \frac{1}{2L_f}\Bigg[\frac{N_2}{N_1}V_{dc}\Delta T_1^2 - 4\left\{\left(V_{bat}D_{402}T - \frac{N_2}{N_1}V_{dc}\right)D_{403}T - L_f i_{Lf}(0)\right\} \\ &\quad \Delta T_1 - 4\left(\frac{N_2}{N_1}V_{dc}(D_{403}T)^2 - V_{bat}D_{402}T\right)\Bigg]\end{aligned} \quad (21)$$

In order to suppress magnetic bias of the transformer 6, $\Delta I_{int}$ needs to be zero. Therefore, from expression (21), the correction period $\Delta T_1$ can be represented as follows.

[Mathematical 22]

$$\Delta T_1 = 2\frac{\beta_1 - \sqrt{\beta_1^2 + \frac{N_2}{N_1}V_{dc}\left\{\frac{N_2}{N_1}V_{dc}(D_{403}T)^2 - V_{bat}D_{402}T\right\}}}{\frac{N_2}{N_1}V_{dc}} \quad (22)$$

It is noted that $\beta 1$ in expression (22) is defined as follows.

[Mathematical 23]

$$\beta_1 = \left(V_{bat}D_{402}T - \frac{N_2}{N_1}V_{dc}\right)D_{403}T - L_f i_{Lf}(0) \quad (23)$$

Figure 26:
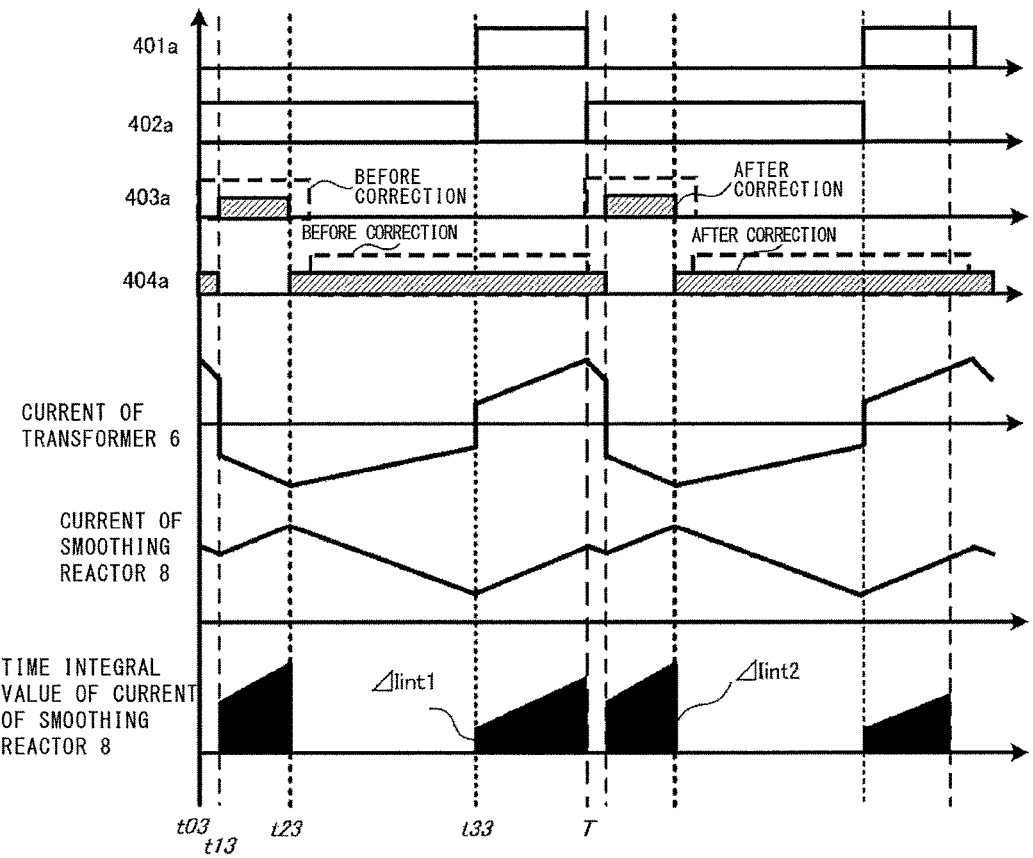
FIG. 26 is a diagram showing the operation principle of the power conversion device shown in embodiment 3 of the present invention.

Next, the case of considering a correction period $\Delta T2$ for the power transmission period in the second operation sub mode in FIG. 24 will be described. As shown in FIG. 26, in the case of considering the correction period $\Delta T2$, the ON timing of the semiconductor switching element 402a is denoted by t03, and the OFF timing of the semiconductor switching element 403a is denoted by t13. In addition, the ON timing of the semiconductor switching element 401a is denoted by t23, and the OFF timing of the semiconductor switching element 404a is denoted by t33. In this case, operation modes can be classified into four operation modes of t03 to t13, t13 to t23, t23 to t33, and t33 to T.

The above four operation mode periods can be represented as shown by expressions (24) to (27). It is noted that the initial time t03 is set at 0.

[Mathematical 24]

$$t_{13} = \frac{\Delta T_2}{2}. \quad (24)$$

[Mathematical 25]

$$t_{23} - t_{13} = D_{403}T - \Delta T_2. \quad (25)$$

[Mathematical 26]

$$t_{33} - t_{23} = (D_{402} - D_{403})T + \frac{\Delta T_2}{2}. \quad (26)$$

[Mathematical 27]

$$T - t_{33} = (1 - D_{402})T. \quad (27)$$

As in the above first operation sub mode, deviation $\Delta I_{int}$ of the time integral value of current of the smoothing reactor 8 in the second operation sub mode is represented by expression (28).

[Mathematical 28]

$$\begin{aligned}\Delta I_{int} &= \Delta I_{int2} - \Delta I_{int1} \\ &= \frac{1}{2L_f}\Bigg[\frac{N_2}{N_1}V_{dc}\Delta T_2^2 - \left\{\left(2\frac{N_2}{N_1}V_{dc} - V_{bat}\right)D_{403}T + 2L_f i_{Lf}(0) - \right. \\ &\quad 2\frac{N_2}{N_1}V_{dc}(1 - D_{402})T\Bigg\}\Delta T_2 + \\ &\quad \left[\frac{N_2}{N_1}V_{dc}\{(D_{403} + 2D_{402} - 2)D_{403} - (1 - D_{402})^2\}T - \right. \\ &\quad 2V_{bat}\{(D_{402} - 2D_{403} - 2)D_{402} + D_{403})\}T + 2L_f i_{Lf}(0)D_{403}\Bigg]T\end{aligned} \quad (28)$$

As in the above first operation sub mode, in order to suppress magnetic bias of the transformer 6, $\Delta I_{int}$ needs to be zero. Therefore, from expression (28), the correction period $\Delta T2$ is represented as follows.

[Mathematical 29]

$$\Delta T_2 = \frac{\beta_2 - \sqrt{\beta_2^2 - 4\frac{N_2}{N_1}V_{dc}\gamma_2}}{2\frac{N_2}{N_1}V_{dc}} \quad (29)$$

It is noted that β2 and γ2 in expression (29) are defined as follows.

[Mathematical 30]

$$\beta_2 = \left(2\frac{N_2}{N_1}V_{dc} - V_{bat}\right)D_{403}T + 2L_f i_{Lf}(0) - 2\frac{N_2}{N_1}V_{dc}(1 - D_{402})T \quad (30)$$

[Mathematical 31]

$$\gamma_2 = \left[\frac{N_2}{N_1}V_{dc}\{(D_{403} + 2D_{402} - 2)D_{403} - (1 - D_{402})^2\}T - 2V_{bat}\right.$$
$$\left.\{(D_{402} - 2D_{403} - 2)D_{402} + D_{403})\}T + 2L_f i_{Lf}(0)D_{403}\right]T \quad (31)$$

The correction periods of expression (22) and expression (29) can be calculated from detected values of voltage ($V_{dc}$) of the DC capacitor 5 and voltage ($V_{bat}$) of the smoothing capacitor 9, and calculated values of a current value ($i_{Lf}$) of the smoothing reactor 8, the duty cycle $D_{401}$ for the semiconductor switching element 401a, the duty cycle $D_{402}$ for the semiconductor switching element 402a, and the phase shift amount $D_{403}$ for the second leg, during the device operation. It is noted that the voltage value ($V_{dc}$) of the DC capacitor 5 and the voltage value ($V_{bat}$) of the smoothing capacitor 9 do not necessarily need to be detected values, but may be target voltages for the respective voltage values, or may be calculated values. In addition, the current value ($i_{Lf}$) of the smoothing reactor 8 does not necessarily need to be a calculated value, but may be a detected value detected by a current detector.

In the above description, the case of correcting the phase shift amount $D_{403}$ for the second leg has been described. However, the duty cycle (ON period) for the first leg composed of the semiconductor switching element 401a and the semiconductor switching element 402a may be corrected. Also in this case, the duty cycles for the semiconductor switching element 401a and the semiconductor switching element 402a are corrected using similar correction values as in expression (22) and expression (29). That is, the correction of the ON period for the first leg is performed on the basis of the voltage value of the DC capacitor, the voltage value of the smoothing capacitor, the current value of the smoothing reactor, the calculated value of the duty cycle for the first switching element, the duty cycle for the second switching element, and the calculated value of the phase shift amount for the second leg. It is noted that, as described in embodiment 1, the upper limit value of the phase shift amount $D_{403}$ depends on the duty cycles $D_{401}$ and $D_{402}$ for the semiconductor switching elements 401a and 402a, and therefore, in the case where $D_{401}$ and $D_{402}$ are corrected, the upper limit value of the phase shift amount $D_{403}$ is also to be corrected accordingly.

In the present embodiment, processes for generating the gate signal for the semiconductor switching element 401a generated from the duty command value 25 for $D_{401}$ and the gate signal for the semiconductor switching element 402a generated from the duty command value 24 for $D_{402}$ are the same as in embodiments 1 and 2, and the description thereof is omitted. In the case where a saw-tooth wave is used as a carrier wave as in embodiment 1, processes for generating the gate signals for the semiconductor switching element 403a and the semiconductor switching element 404a generated from the phase shift amount command value 37 and the correction period for the power transmission period, will be described.

Figure 27:
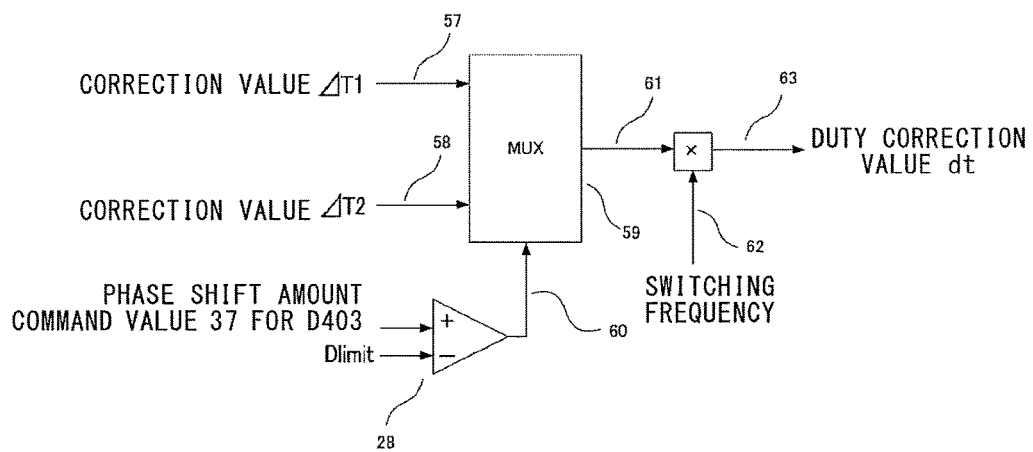
FIG. 27 is a diagram showing a control system of the power conversion device shown in embodiment 3 of the present invention.

FIG. 27 is a calculation block diagram for generating a duty correction value dt for the semiconductor switching element 403a and the semiconductor switching element 404a from the correction periods $\Delta T1$ and $\Delta T2$ calculated by substituting the instantaneous values during the device operations into expression (22) and expression (29), the phase shift amount command value 37 for $D_{403}$, and $D_{limit}$ 28. First, the correction period $\Delta T1$ (57) and the correction period $\Delta T2$ (58) are inputted to a selector (MUX) 59. The selector 59 selects the correction period $\Delta T1$ (57) and the correction period $\Delta T2$ (58) in accordance with a calculation result 60 of magnitude comparison between the phase shift amount command value 37 for $D_{403}$ and $D_{limit}$ 28. If the phase shift amount command value 37 for $D_{403}$ is smaller than $D_{limit}$ 28, the correction period $\Delta T1$ (57) is used as a correction value 61. On the other hand, if the phase shift amount command value 37 for $D_{403}$ is greater than $D_{limit}$ 28, the correction period $\Delta T2$ (58) is used as the correction value 61. A product of the correction value 61 and a switching frequency 62 of the semiconductor switching elements 401a to 404a is outputted as a duty correction value dt63.

Figure 28:
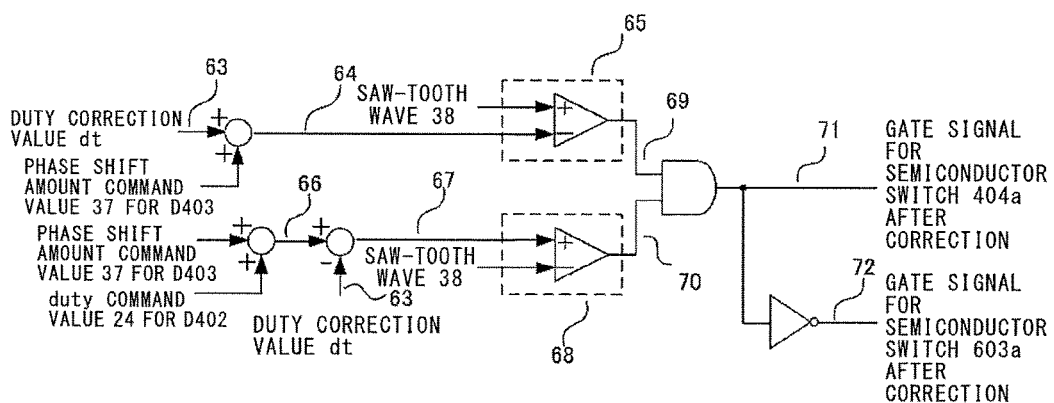
FIG. 28 is a diagram showing the control system of the power conversion device shown in embodiment 3 of the present invention.

As shown in FIG. 28, an addition value 64 obtained by summing the duty correction value dt63 and the phase shift amount command value 37 for $D_{403}$, and the saw-tooth wave 38 are inputted to a gate signal generator 65. In addition, the phase shift amount command value 37 for $D_{403}$ and the duty command value 24 for $D_{402}$ are summed to obtain a phase shift amount signal 66. A difference value 67 between the phase shift amount signal 66 and the duty correction value dt63, and the saw-tooth wave 38 are inputted to a gate signal generator 68. A signal representing a logical conjunction of a comparison signal 69 between the addition value 64 and the saw-tooth wave 38 and a comparison signal 70 between the saw-tooth wave 38 and the difference value 67, is used as a gate signal 71 for the semiconductor switching element 404a. A signal representing a negation of the gate signal 71 is used as a gate signal 72 for the semiconductor switching element 403a. As described above, the gate signals for the semiconductor switching elements 403a and 404a can be generated.

In the above gate signal generation processes, a saw-tooth wave is used for a carrier wave as in embodiment 1. However, as shown in embodiment 2, a triangular wave may be used for a carrier wave.

In the present embodiment, the case of not providing a dead time between the ON period of the semiconductor switching element 401a and the ON period of the semiconductor switching element 402a, has been shown. However, the dead time may be provided. Similarly, a dead time may be provided between the semiconductor switching element 403a and the semiconductor switching element 404a.

In the present embodiment, owing to the above configuration, a stable operation in which a magnetic bias phenomenon in the transformer 6 is suppressed is achieved, and in the above configuration and control, as in the power conversion devices shown in embodiments 1 and 2, it is possible to achieve high-power-factor control and output power control at the same time by a single stage of full-bridge inverter circuit.

DESCRIPTION OF THE REFERENCE CHARACTERS

1 AC power supply
3 reactor
5 DC capacitor
6 transformer
8 smoothing reactor
9 smoothing capacitor
10 DC load
11 control circuit
200 first rectification circuit
201 to 204 diode element
401a to 404a semiconductor switching element (first to fourth switching elements)
401b to 404b diode
401c to 404c capacitor
700 second rectification circuit
701 to 704 diode

The invention claimed is:

1. A power conversion device comprising:
a first rectification circuit which rectifies AC power inputted from an AC power supply;
an inverter circuit having a first leg, a second leg, and a DC capacitor connected in parallel to each other, the first leg having a first switching element and a second switching element connected in series to each other by way of a first AC end, a positive-side DC terminal of the first rectification circuit being connected via a reactor to the first AC end which is a connection point between the first switching element and the second switching element, the second leg having a third switching element and a fourth switching element to which diodes are respectively connected in antiparallel, the third switching element and the fourth switching element being connected in series to each other, the inverter circuit having a negative-side DC bus connected to a negative-side DC terminal of the first rectification circuit;
a transformer having a primary winding and a secondary winding, one end of the primary winding being connected to the first AC end of the inverter circuit, and another end of the primary winding being connected to a second AC end which is a connection point between the third switching element and the fourth switching element;
a second rectification circuit having one end connected to the secondary winding of the transformer and another end connected to a DC load via a smoothing capacitor, the second rectification circuit rectifying AC power inputted from the transformer, and outputting the rectified AC power to the DC load;
a control circuit which controls operation of the inverter circuit;
a voltage detector which detects DC voltage of the DC capacitor; and
a current detector which detects current outputted from the first rectification circuit, wherein
the control circuit determines an ON period for the first leg on the basis of a detection result of the current detector, and controls the first switching element and the second switching element on the basis of the determined ON period for the first leg, thereby controlling current outputted from the first rectification circuit, and
on the basis of a detection result of the voltage detector and the determined ON period for the first leg, the control circuit controls an ON period for the second leg and a phase shift amount between the ON period for the first leg and the ON period for the second leg, thereby controlling voltage of the DC capacitor to be constant, and wherein
the control circuit controls the ON period for the first leg so that current outputted from the first rectification circuit becomes predetermined target sinewave current, and
the control circuit controls the phase shift amount and the ON period for the second leg so that voltage of the DC capacitor becomes target voltage which is higher than peak voltage of AC voltage inputted from the AC power supply.

2. The power conversion device according to claim 1, wherein
the control circuit uses:
a first operation mode in which the first switching element and the fourth switching element are turned on;
a second operation mode in which the first switching element and the third switching element are turned on;
a third operation mode in which the second switching element and the third switching element are turned on; and
a fourth operation mode in which the second switching element and the fourth switching element are turned on, and
the control circuit controls respective periods of the first to fourth operation modes in this order, thereby controlling the inverter circuit.

3. The power conversion device according to claim 1, wherein
the control circuit uses:
a first operation mode in which the first switching element and the fourth switching element are turned on;
a second operation mode in which the first switching element and the third switching element are turned on;
a third operation mode in which the second switching element and the third switching element are turned on; and
a fourth operation mode in which the second switching element and the fourth switching element are turned on, and
the control circuit controls the inverter circuit, using a first operation sub mode in which respective periods of the first to fourth operation modes are controlled in this order, and a second operation sub mode in which the respective periods are controlled in order of the fourth operation mode, the third operation mode, the fourth operation mode, and then the first operation mode.

4. The power conversion device according to claim 1, wherein
the control circuit controls the phase shift amount between the ON period for the first leg and the ON period for the second leg, using, as an upper limit, the smaller one of two ON periods of the first switching element and the second switching element.

5. The power conversion device according to claim 1, wherein
the control circuit synchronizes timings of shifting phases for the third switching element and the fourth switching element, with each other.

6. The power conversion device according to claim 1, wherein
the control circuit controls the ON periods for the first leg and second leg and the phase shift amount for the second leg so that a period during which an ON period of the first switching element and an ON period of the fourth switching element which is diagonal thereto overlap each other, and a period during which an ON period of the second switching element and an ON period of the third switching element which is diagonal thereto overlap each other, become equal to each other.

7. The power conversion device according to claim 6, further comprising a smoothing reactor connected to a DC terminal of the second rectification circuit, wherein
the control circuit controls the ON period for the second leg on the basis of a voltage value of the DC capacitor, a voltage value of the smoothing capacitor, a current value of the smoothing reactor, a calculated value of a duty cycle for the first switching element, a duty cycle for the second switching element, and a calculated value of the phase shift amount for the second leg.

8. The power conversion device according to claim 6, further comprising a smoothing reactor connected to a DC terminal of the second rectification circuit, wherein
the control circuit controls the ON period for the first leg on the basis of a voltage value of the DC capacitor, a voltage value of the smoothing capacitor, a current value of the smoothing reactor, a calculated value of a duty cycle for the first switching element, a duty cycle for the second switching element, and a calculated value of the phase shift amount for the second leg.

9. The power conversion device according to claim 1, wherein
the control circuit controls the first switching element and the second switching element so that their ON and OFF states are inverted relative to each other, and
in an initial state in which the phase shift amount is zero, the control circuit controls a gate pulse width and a phase for the third switching element to be equal to those for the first switching element, and controls a gate pulse width and a phase for the fourth switching element to be equal to those for the second switching element.

10. The power conversion device according to claim 9, wherein
the control circuit uses saw-tooth waves as carrier waves for the first leg and the second leg, and
the control circuit performs control such that, as the phase shift amount increases,
a phase of rising of a gate pulse for the third switching element is shifted relative to a phase of rising of a gate pulse for the first switching element while an ON period of the third switching element is made equal to an ON period of the first switching element, and
a phase of rising of a gate pulse for the fourth switching element is shifted relative to a phase of rising of a gate pulse for the second switching element while an ON period of the fourth switching element is made equal to an ON period of the second switching element.

11. The power conversion device according to claim 9, wherein
the control circuit uses triangular waves as carrier waves for the first leg and the second leg, and
the control circuit performs control such that, as the phase shift amount increases,
a phase of rising of a gate pulse for the third switching element is shifted relative to a phase of rising of a gate pulse for the first switching element while an ON period of the third switching element is made equal to an ON period of the first switching element, and
a phase of rising of a gate pulse for the fourth switching element is shifted relative to a phase of rising of a gate pulse for the second switching element while an ON period of the fourth switching element is made equal to an ON period of the second switching element.

12. The power conversion device according to claim 1, wherein
the control circuit controls the first switching element and the second switching element so that their ON and OFF states are inverted relative to each other, and
in an initial state in which the phase shift amount is zero, the control circuit controls a gate pulse width and a phase for the third switching element to be equal to those for the second switching element, and controls a gate pulse width and a phase for the fourth switching element to be equal to those for the first switching element.

13. The power conversion device according to claim 12, wherein
the control circuit uses saw-tooth waves as carrier waves for the first leg and the second leg, and
the control circuit performs control such that, as the phase shift amount increases,
a phase of rising of a gate pulse for the third switching element is shifted relative to a phase of rising of a gate pulse for the second switching element while an ON period of the third switching element is made equal to an ON period of the first switching element, and
a phase of rising of a gate pulse for the fourth switching element is shifted relative to a phase of rising of a gate pulse for the first switching element while an ON period of the fourth switching element is made equal to an ON period of the second switching element.

14. The power conversion device according to claim 12, wherein
the control circuit uses triangular waves as carrier waves for the first leg and the second leg, and
the control circuit performs control such that, as the phase shift amount increases,
a phase of rising of a gate pulse for the third switching element is shifted relative to a phase of rising of a gate pulse for the second switching element while an ON period of the third switching element is made equal to an ON period of the first switching element, and
a phase of rising of a gate pulse for the fourth switching element is shifted relative to a phase of rising of a gate pulse for the first switching element while an ON period of the fourth switching element is made equal to an ON period of the second switching element.

* * * * *